(12) United States Patent
Kiso et al.

(10) Patent No.: US 6,796,427 B2
(45) Date of Patent: Sep. 28, 2004

(54) TAPE CASSETTE STORING CASE

(75) Inventors: Hiroyuki Kiso, Miyagi (JP); Takatsugu Funawatari, Miyagi (JP)

(73) Assignee: Sony Corporation (JP)

( * ) Notice: Subject to any disclaimer, the term of this patent is extended or adjusted under 35 U.S.C. 154(b) by 339 days.

(21) Appl. No.: 09/963,528

(22) Filed: Sep. 27, 2001

(65) Prior Publication Data

US 2002/0041763 A1 Apr. 11, 2002

(30) Foreign Application Priority Data

Oct. 3, 2000 (JP) ........................................ 2000-304244
Apr. 19, 2001 (JP) ........................................ 2001-121702

(51) Int. Cl.⁷ .......................................... B65D 85/672
(52) U.S. Cl. .................................................. 206/387.1
(58) Field of Search ........................ 206/387.1, 387.13, 206/387.11, 521, 591, 592

(56) References Cited

U.S. PATENT DOCUMENTS 5,154,287 A * 10/1992 Morita ................... 206/387.15
5,232,093 A *  8/1993 Hashizume et al. ... 206/387.13
5,690,224 A * 11/1997 Koizumi .................. 206/387.1

FOREIGN PATENT DOCUMENTS

| JP | 8-253285  | 10/1996 |
| JP | 9-40065   | 2/1997  |
| JP | 10-258888 | 9/1998  |

* cited by examiner

Primary Examiner—Jacob K. Ackun, Jr.
(74) Attorney, Agent, or Firm—Rader, Fishman & Grauer PLLC; Ronald P. Kananen

(57) ABSTRACT

A tape cassette storing case for storing a tape cassette comprises a cubic body with lateral walls, a lid body with lateral walls, and a junction member constituting one of the lateral walls of the lid body in linkage with the cubic body and the lid body via hinging means; and a pair of cylindrical members are vertically disposed on a bottom plate of the cubic body by way of being idly inserted in hub holes of a tape supplying and tape take up reel; wherein each of the hub holes comprises a driving pawl hole having an inner peripheral surface formed with a reel-driving pawl, and a reference hole that is formed in concentricity with the driving pawl hole and provided with a diameter smaller than that of the driving pawl hole; and the pair of cylindrical members are respectively formed to be of a height enough to arrive at the reference hole.

19 Claims, 26 Drawing Sheets

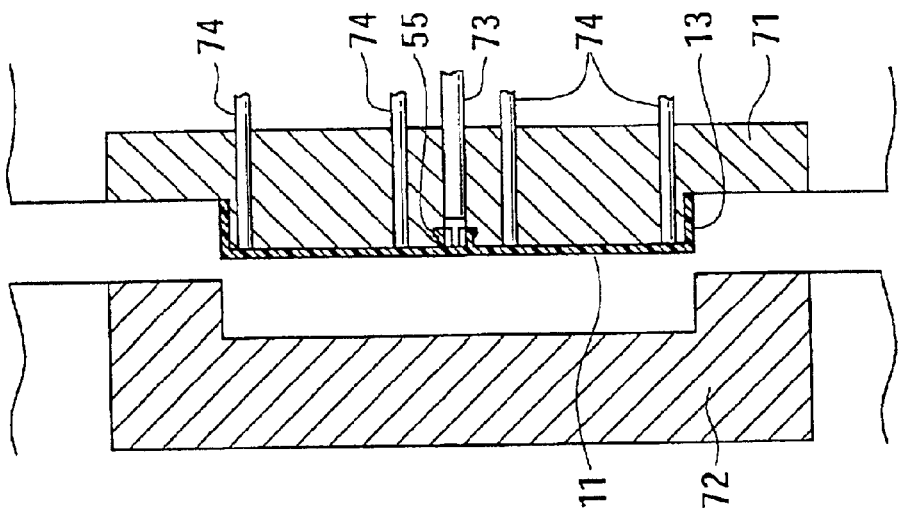
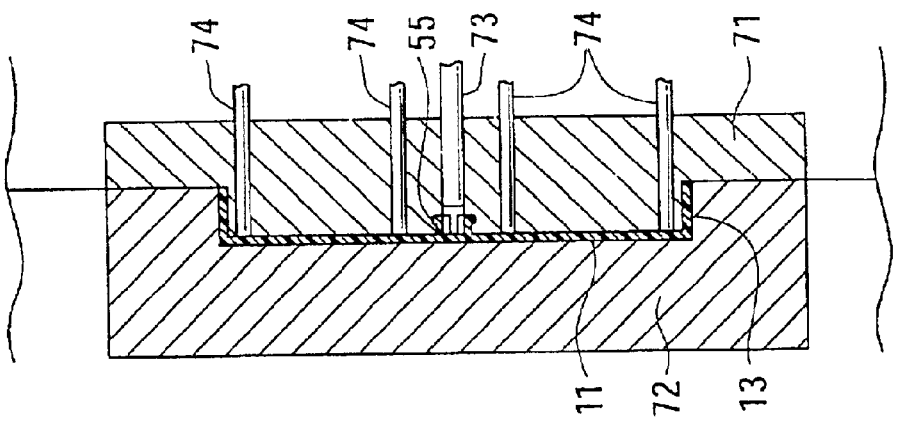
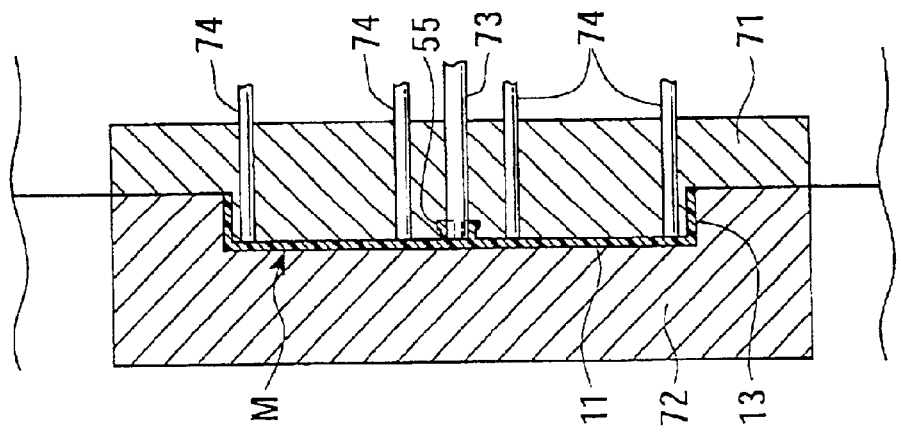

FIG. 25A
FIG. 25B
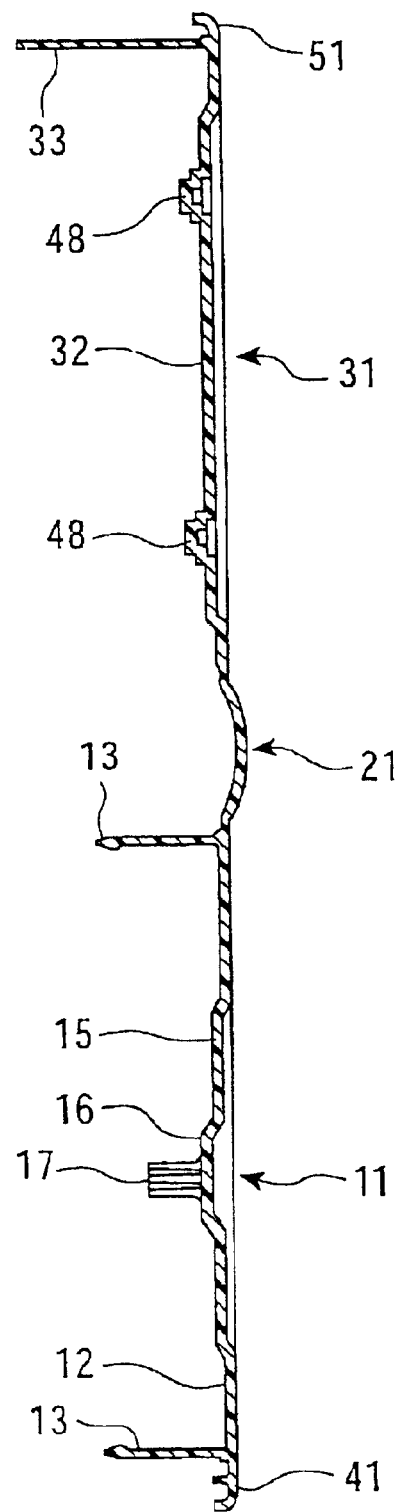
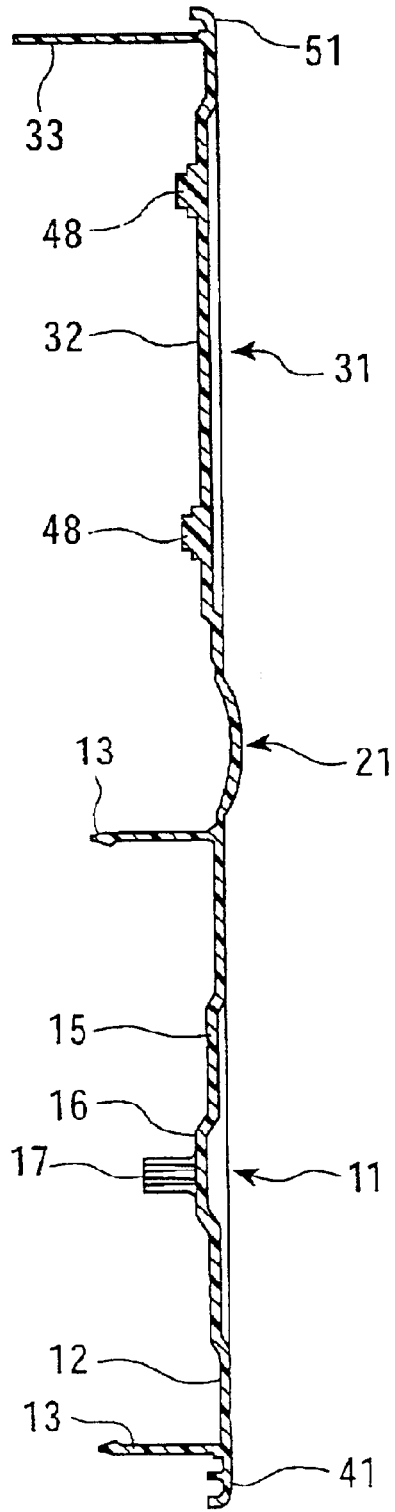

TAPE CASSETTE STORING CASE

CROSS REFERENCE TO RELATED APPLICATION

This application claims priority to Japanese Patent Applications No. JP 2000-304244 and JP 2001-121702, and the disclosure of those applications are incorporated herein by reference to the extent permitted by law.

BACKGROUND OF THE INVENTION

1. Field of the Invention

The present invention relates to a tape cassette storing case. More particularly, the present invention relates to such a tape cassette storing case which is capable of preventing a tape wound on reels of the tape cassette from being loosened or deviated and also preventing reels and component parts of the tape cassette from incurring unwanted damage when the tape cassette incurs a shock via falling onto a rigid floor or the ground, for example.

2. Description of the Related Art

In order to keep video tape cassettes used for broadcasting stations and conventional consumers as library sources, generally, many of them are stored in plastic cases prepared for storage. FIG. 29 exemplifies an external perspective view of a tape cassette storing case 100 in the related art, where FIG. 29A shows the case when a lid is closed, whereas FIG. 29B shows the case when the lid is held open.

In an example shown in FIG. 29, the tape cassette storing case 100 comprises the following: a cubic case 101 having four lateral walls 103, a lid member 301 having three lateral walls 303, and a junction member 201 which is connected to a bottom plate 102 of the cubic case 101 and a ceiling plate 302 of the lid member 301 via a pair of hinges 202 and 203 so that the junction member 201 become a lateral wall of the lid member 301 when the lid member 301 is closed An insertion pocket 304 is disposed at the center portion of the surface of the lid member 301, where the insertion pocket 304 is made from a transparent film attached on the lid member 301 by, for example, spot fusion utilizing a high-frequency dielectric heating process for allowing insertion of title cards, for example. Further, a front-side lateral wall 303, being opposite from the junction member 201, is reinforced by a rib 303r, whereas a pair of lateral-wall locking members 306 are disposed on both ends. Further, a card-inserting pocket 307 for allowing the insertion of recording cards is disposed inside of the lid member 301 by way of fusing a transparent film with a right-angled linear portion 307a consisting of a portion abutted with the short-side lateral wall 303 by way of occupying substantially one-half the ceiling plate 302 and a portion abutted with the hinge 203.

The above-referred four lateral walls 103, each having a lowered center portion are continuously formed in the cubic case 101. A pair of stopper holes 106 for engaging the hooks 306f of the above-referred lateral-wall locking members 306 therewith are formed at both end portions of the front-side lateral wall 103. In addition, a pair of cylindrical members 107 for engaging a tape cassette are disposed at the center portions of the bottom plate 102, which are individually and idly inserted into hub-holes of reels from the back surface of the tape cassette being stored FIG. 30 designates a state in which a professional purpose tape cassette C is stored inside of the cubic case 101 of the tape cassette storing case 100 while the lid member 301 remains open. In FIG. 30, only the front surface of the tape cassette C is shown by way of deleting the hub holes on the back surface.

The professional purpose tape cassette C is stored in the storing case 100 and serves as a library source. Nevertheless, a tape cassette C in the related art has a substantial dimension with 254 mm of width, 143 mm of length, and 15 mm of thickness, for example, and yet, it also has a substantial weight. Because of this, it is possible that a broadcasting station staff member may accidentally drop a storing case accommodating tape cassettes C onto a hard concrete floor in a library or a road on the way to preparing indoor or outdoor filming. Inasmuch as the storing case 100 is rarely provided with such a measure to resist shock when the storing case 100 is dropped from a high position, the video tape stored in the tape cassette C is substantially loosened thereby making it quite difficult to properly load the tape cassette C into a video tape recorder or resulting in the destruction of the latchet mechanism for locking the rotation of the reels on which the video tape is wound, thus raising a critical problem. Even when incurred damage is negligible, a problem often arises in which the edges of the tape wound on the reels incur unwanted damage, and this results in the generation of a distorted video picture. In addition, there is a problem in which the lateral-wall locking member 306 may be loosened to cause the lid member 301 to be opened very easily.

To prevent the above problems from occuring, Japanese Patent Laid-Open Publication No. 08-253285 (1996) disclosed a cassette case provided with elastically deformable shock-absorbing members along the external peripheral portions, for example. Concretely, the above Patent Publication disclosed a storing case that is designed to alleviate shock by means of flanges consisting of upper and lower plates of the cassette case, respectively, being extended in the external direction and ribs that are disposed at least in the neighborhood of corner portions of the flanges by way of projecting themselves in the vertical direction. In addition, the Japanese Patent Laid-Open Publication No. 09-40065 (1997) proposed such a carrying case designed to prevent the video tape from being loosened by means of the following. In order to prevent the reels inside of a tape cartridge from idly moving themselves when incurring shock via falling, a first elastic member was provided, which was forcibly brought into contact with a plurality of tape cartridges disposed on the bottom surface of a lid member a sheet-form second elastic member which was forcibly brought into contact with the tape cartridges, where the second elastic member internally contains air fed via a plurality of air holes formed through the bottom surface of the main body, and a third sheet-form elastic member which was forcibly brought into contact with a tape supplying reel and a tape winding reel of each of the tape cartridges, where the third elastic member was disposed at a plurality of air holes formed through the external periphery of a positioning projection of each of the tape cartridges and by way of covering air holes. To form the first elastic member, aside from such a sheet-form elastic member internally filled with air, a coil spring is provided with a holding member at the tip portion and a plate-form sponge member with rectangular shape were respectively exemplified.

Further, the Japanese Patent Laid-Open Publication No. 10-258888 (1998) disclosed a tape cassette storing case, which was designed to cause a reel-base formed on a vertically movable shell-holding member for supporting a shell of the tape cassette to be afloat above the shell of the tape cassette after accommodating the tape cassette therein. Concretely, after ending a recording or replaying process, when drawing a tape cassette out from a video tape recorder, floating reels are lowered to core into contact with a shell of a tape cassette. However, there is such a case in which the tape cannot be lowered due to adhesion to the tape guide posts to cause the upper edge of the tape to be pressed against the upper reel whereby generating deformation. The above arrangement was designed to prevent probable deformation of the tape from being generated. To constitute such an elastic member for vertically moving the shell holding member, a center plate spring or an open-sided plate spring secured to the bottom surface of the tape storing portion, a coil spring, or bellow-formed plastic material, was introduced.

The tape cassette storing case disclosed by the above Japanese Patent Laid-Open Publication No. 08-253285 (1996) was designed to cause ribs disposed in the neighborhood of flanges to project themselves from the flanges in the upward and downward directions. Since it is difficult to extract them from a mold, when forming up a storing case, it is impossible to mold it via a single shooting process. Because of this, the art proposed by the above Patent Publication introduces such a method which previously prepares such portions corresponding to flanges and ribs for previous insertion into a mold followed by an injection process to form the main body portion before eventually integrating them into a unit. However, this in turn complicates the production process to cause the production cost to rise.

On the other hand, it will be possible to relax the shock by way of utilizing sheet-form elastic members used for the carrying case, as proposed by the Japanese Patent Laid-Open Publication No. 09 40065 (1997). However, in this case, it is required to execute such a process to fuse or adhere peripheral portions of the sheet-form elastic members as of the state in which air is internally sealed against the bottom surface of the storing case, for example. This also complicates the production process to cause the production cost to rise.

In regard to the tape cassette storing case proposed by the other Japanese Patent Laid-Open Publication No. 10-258888 (1998), any of the plate spring, the coil spring, and the bellow-formed plastic material used for elastically supporting the tape cassette was discretely prepared before being secured to the bottom surface of the tape cassette storing case. This in turn results in an increased number of component parts and requires additional work for installing them.

SUMMARY OF THE INVENTION

It is desired to provide a tape cassette storing case which is capable of freeing reels and component parts of tape cassettes from incurring undesired damage when being subjected to shock, for example, due to falling, and yet enables the production process to be executed easily and inexpensively.

A tape cassette storing case according to one embodiment of the present invention is provided with a linkage among a cubic case which is provided with lateral walls, a lid member which is provided with lateral walls and covers the cubic case, and a junction portion for constituting a lateral wall of the lid member via hinges. The tape cassette storing case stores such a tape cassette incorporating a tape-supplying reel and a tape winding reel inside of a shed. The tape cassette storing case incorporates a pair of vertically disposed cylindrical members which are idly inserted into hub holes of the tape-supplying reel and the tape winding reel against the bottom-surface plate of the cubic case. The hub holes consist of a driving-pawl-hole portion having a reel-driving pawl formed on an internal peripheral surface and a reference-hole portion which is formed in concentricity with the driving-pawl-hole portion and provided with a diameter narrower than that of the driving-pawl-hole portion. The above pair of cylindrical members are formed by such a height reaching at the reference-hole portion. When the tape cassette storing case incurs a shock force having a component in the direction parallel to the bottom surface plate and the ceiling plate, relative to the contact between a pair of cylindrical members and the reference hole portions of individual reels, both of the cylindrical members easily elastically deform themselves to buffer incurred shock, thereby preventing the reels and component parts of the tape cassette from being damaged.

In a tape cassette storing case according to another embodiment of the present invention, either a single unit or a plurality of elastically deformable projected surface portions are integrally formed, wherein the elastically deformable projected surface portions individually project themselves inwardly and have space within the projected surface portion at least on either of the bottom surface of the cubic case and the ceiling surface of the lid member, whereby the elastically deformable projected surface portions individually support the tape cassette by way of being abutted with the shell of the tape cassette or at least one of the tape reels. Whenever incurring a shock force having a component along direction perpendicular to the bottom and ceiling plates of the tape cassette storing case, the elastically deformable projected surface portions formed on the bottom and ceiling plates elastically deform themselves in the vertical direction to buffer the shock incurring to the tape cassette. Owing to this arrangement, neither reels nor component parts of the tape cassette will receive unwanted damage.

As mentioned above, at least one of the tape reels is held by the elastically deformable projected surface portions in the present embodiment. This is to deal with either case in which a brand new video tape of a tape cassette stored in the storing case is fully wound on a supplying reel (one of the reels) or a case in which a video tape is fully wound on the supplying reel via rewinding after completing a recording or replaying process. Even when the video tape is wound on a rewinding reel (the other reel of the reels), it is of course desirable that both reels are supported by the elastically deformable projected surface portions.

By way of elastically deforming in the upward and downward directions, a shock force component perpendicular to the bottom and ceiling plates is buffered by the projected surface portions formed on at least one of the bottom plate or the ceiling plate of the cubic case. The projected surface portion may comprise a single projected surface portion formed on the whole surface of the bottom plate or the ceiling plate, for example, or such a single projected surface portion which is formed on the bottom surface of the shell of a tape cassette being stored and concentrically placed at least on one part of a pair of reel base inserting openings for allowing insertion of the reel base ascending from a video tape recorder. In addition to a pair of horizontally lengthy projected surface portions aligned parallel to each other by way of sandwiching the above-referred two of the reel base inserting openings, the projected surface portion may comprise more than three of them. It should be noted that when a single projected surface portion merely occupies a small area, the amount of elastically deformable area decreases, whereby the shock buffering effect also is lessened.

The projected surface portion may also be formed cubically by way of providing an extremely low-height frustum of circular cone devoid of bottom surface, or a frustum of a pyramid or a cylindrical form. A cubic form of the projected surface portion is not particularly limited. However, by way of providing a frustum of circular cone form, its oblique lateral wall promotes elastic deformation in the vertical direction. It is also allowable to form more than two stages of the projected surface portions by upwardly projecting the upper surface of the projected surface portions. In this case, it is conceivable to provide a method which initially inserts the uppermost projected surface into the reel base inserting opening of the shell of the tape cassette and then brings the inserted projected surface portion into contact with the shell to support the tape cassette, and another method which brings the projected surface portion into contact with the shell of the tape cassette to support the tape cassette. Either of these methods generates a shock relaxing effect as well. The former method includes such a form for supporting the tape cassette by way of causing the reels to be afloat above the shell.

When the shock is lessened by the projected surface portion formed on either one of the bottom plate of the cubic case and the ceiling plate of the lid member respectively sandwiching the upper and bottom surfaces of the tape cassette, the other one of the bottom plate and the ceiling plate may have a rigid surface. However, it is preferred to provide a tape cassette storing case having both surfaces sandwiched by the elastically deformable projected surface portions. It is preferred to sandwich both surfaces of the tape cassette with such projected surface portions having heights equivalent to each other. It is also allowable to provide one surface with multiple-stage projected surface portions and the other surface with such a projected surface lower than the height of the multiple-stage projected surface portions. A single unit or a plurality of projection portions may be formed on the upper surface of a projected surface lower than the height of the multiple-stage projected surface portions, whereby the multiple-stage projected surface portions and the other projected surface portion sandwich the tape cassette.

It is also possible to initially provide the upper surface of a single step projected surface portion or the uppermost surface of the multiple stage projected surface portions with a cylindrical member formed with a plurality of slits at least in the height direction to allow the cylindrical member to be loosely inserted into hub holes of the tape cassette. Owing to this arrangement, a shock fore component incurring to the tape cassette in the direction parallel to the bottom plate and the ceiling plate is lessened due to the deformation of the cylindrical member. The number and length of the slits for enabling the deformation have a specific relationship with the thickness of the cylindrical member, and thus, these requirements are properly set in the course of designing the tape cassette to be stored. In order to properly determine the gradient for facilitating an easy extraction of the molded piece out from its mold, it is desired that the slit width be increased on the part of the tip portion of the cylindrical member. This gradient is also properly determined in the course of designing.

In a tape cassette storing case according to still another embodiment of the present invention, at least one of the lateral walls of the cubic case comprises lateral-wall members and a projected wall member upwardly projecting itself from a predetermined position of the upper edge thereof, where at least the upper edge portion of the projected wall member is formed toward an inward direction of the cubic case. When the tape cassette storing case incurs a shock force having components in the direction parallel to the bottom plate and the ceiling plate, the tape cassette shifts itself inside of the storing case to cause the abutted projected wall members to be deformed elastically, thus properly buffering the shock incurring to the tape cassette.

The projected wall members may be formed in a square shape. In place of this, the projected wall members may also be formed into a trapezoidal shape, a triangular shape, a semi-spherical shape, or any other shape. Further, by way of providing the inner surface of the upper end portions of the projected wall members with projected portions, the tape cassette itself is brought into contact with the free upper end portion of the projected wall members via the projected portions. This consequently causes the elastically deformable amount of the projected wall members to be increased, thereby effectively buffering shock incurring to the tape cassette.

In a tape cassette storing case according to still another embodiment of the present invention, a junction portion comprises a substantially outwardly projecting arc-form elastically deformable curved surface, and yet substantially identical arc-form ribs are formed on the inner surface at both longitudinal-directional ends. When the junction portion of the tape cassette storing case incurs shock, both end portions of the junction portion are supported by the ribs, whereas the intermediate curved surface lowers to elastically deform itself, thereby buffering shock incurring to the tape cassette. In place of utilizing the ribs, the thickness at both end portions may be gradually increased toward the both-end directions.

In a tape cassette storing case according to still another embodiment of the present invention, the bottom plate of the cubic body and the ceiling plate of the lid member outwardly project themselves further from lateral walls of the cubic body and lateral walls of the lid member as thinly configured edge components, where tip portions of the bottom plate and the ceiling plate respectively constitute elastically deformable external peripheral members by way of being formed into an inwardly oriented (by substantially one quarter) elliptic-arc-form surface portion or an inwardly oriented (by substantially one quarter) arc-form surface portion. Owing to this arrangement, when the tape cassette is dropped onto the ground or floor in such a way that the lateral wall faces the ground, curved surfaces at the tip end portions of the external peripheral members buffer shock incurring to the tape cassette by way of elastically deforming themselves in correspondence with extensive falling angles. The projecting width of the external peripheral members is not definitely limited, insofar as the projecting width is not detrimental to the practical use of the tape cassette storing case.

In order to jointly lock the cubic case and the lid member, a lateral-wall locking portion may be provided at such a location where the lateral walls of the cubic case and the lid member overlap themselves at the front lateral wall being opposite from the junction portion. When solely providing the lateral-wall locking portion, it is possible to continuously form the above-referred external peripheral edge portion. When providing a side locking portion on the front lateral surface to effect locking by way of overlapping the bottom plate and a flap plate linked therewith via a hinge in conjunction with a lateral wall of the lid member, as a matter of course, the above-referred external peripheral edge portion is deleted at the side-locking portion. In this case, by way of arranging the flap plate, being locked with the lateral surface of the lid member, to be positioned inner from the tip end portion of the external peripheral edge portion, even if the tape cassette storing case is dropped onto the ground, the flap plate is prevented from directly incurring shock, thus making it possible to prevent the lid member from incidentally being opened via unlocking. Further, by way of effecting the locking between the cubic case and the lid member via the double locking effected by the side-locking portion and the lateral-wall locking portion, the shock-resistant property of the locking mechanism may be promoted furthermore.

A tape cassette storing case according to another embodiment of the present invention comprises those resinous components integrally molded into a complete unit including the following:

a single unit or a plurality of elastically deformable projected surface portions which are formed at least on either of a bottom surface plate of a cubic case and a ceiling surface plate of a lid member, and yet, inwardly project themselves by way of containing space inside of each projection, wherein the elastically deformable projected surface portions jointly support a tape cassette by way of coming into contact with a shell of said tape cassette or at least one of a pair of reels;

a pair of cylindrical members which are vertically disposed on the upper surfaces of said projected surface portions and idly inserted into corresponding hub holes of said reels;

a projected wall portion which projects itself at least from a specific position of the upper edge of one of the lateral walls of said cubic case, wherein a projection is formed on the inner surface of the upper edge thereof, an elastically deformable external peripheral edge portion, wherein a bottom-plate and a ceiling plate individually extend themselves out from lateral walls of said cubic case and lateral walls of said lid member as thinly configured edge components, wherein a tip end portion is formed into an inwardly oriented (by substantially one-quarter) elliptic-arc form surface or an inwardly oriented (by substantially one-quarter) arc form surface; and a junction portion comprising an outwardly projecting arc-form elastically deformable curved surface between a pair of hinges and a plurality of substantially identical arc-form ribs formed on the inner surfaces of longitudinal-directional both end portions.

Even when incurring shock in all directional angles or falling onto the ground or floor irrespective of falling posture, the tape cassette storing case properly buffers shock incurring to the tape cassette stored therein, thereby preventing the reels and component parts of the tape cassette from being damaged. Further, inasmuch as the tape cassette storing case is integrally molded into a complete unit with resinous material production cost can be saved.

By virtue of the integral molding of the above-referred projected surface portions for buffering shock incurring to the tape cassette by way of elastically deforming themselves, projected wall portions, and external peripheral edge portions in conjunction with the cubic case, the lid member, and the junction portion, it is possible to economically produce inexpensive tape cassette storing cases. It is suggested to utilize such synthetic resinous material containing an elasticity modulus less than that of metal and a substantial deformable amount within the elastic limit. In particular, thermoplastic polypropylene resin compatible with injection molding and transfer molding contains a desirable elasticity modulus and plasticity, and yet, it is commercially available at an inexpensive cost, and thus, ideally suitable for use. Insofar as an equivalent elasticity modulus and plasticity are available, any synthetic resinous material other than polypropylene may also be utilized. For example, polyethylene resin with a high content of high-polymer may also be utilized.

According to the tape cassette storing case according to one embodiment of the present invention, whenever the storing case containing such components parallel to the bottom and ceiling plates incurs shock, a pair of cylindrical members are brought into contact with the reference holes of individual reels, whereby the cylindrical members easily generate elastic deformation to buffer the shock to eventually prevent the reels and components of the tape cassette from being damaged.

According to another embodiment of the invention, elastic deformation of the cylindrical members is facilitated to promote an effect for absorbing impact energy.

According to the tape cassette storing case still another embodiment of the present invention, the tape cassette is sustained by elastically deformable projected surface portions which are formed at least on either of the bottom surface of the cubic body member and the ceiling plate of the lid body member, thereby buffering vertical-directional components of the shock incurring to the tape cassette to consequently prevent the reels and components of the tape cassette from incurring unwanted damage. Whenever the shell of the tape cassette is held by projected surface members, the reels remain in contact with the shell, and thus, when the tape cassette actually incurs shock, component parts of the reels can be prevented from incurring unwanted damage as well.

According to still another embodiment of the present invention, inasmuch as projected members inwardly project themselves from the upper surface of the projected surface or the planar surface by way of coming into contact with the shell of the tape cassette, the projected members cause the projected surface to be deformed elastically, thereby buffering shock incurring to the tape cassette.

According to still another embodiment of the present invention, by virtue of the elastic deformation of the elastic material filled inside of the projected members, it is possible to enhance the actual effect for absorbing shock incurring to the tape cassette.

According to still another embodiment of the present invention, by way of utilizing four projections formed at four corners on the internal surface of the ceiling plate of the lid body member for positioning, it is possible to form a card storing pocket for allowing insertion of recording cards formed with a variety of shapes by way of partially fusing a transparent sheet or film.

According to still another embodiment of the present invention, it is possible to prevent a plurality of superposed storing cases from incurring positional deviation or collapse caused by unwanted vibration.

According to still another embodiment of the present invention, inasmuch as the projected surface comprises more than two of the multiple-stage projected surface portions, it is possible to properly set the cross-sectional form and the planar form of individual stages in correspondence with the shape of the shell of the tape cassette, whereby enhancing the actual effect for absorbing shock.

According to still another embodiment of the present invention, inasmuch as the upper surface of the uppermost stage of the multiple-stage projected surface portions sustains the tape cassette by way of abutting on the bottom surface of the reels, both the reels and the tape cassette can be prevented from incurring damage via external shock.

According to still another embodiment of the present invention, by way of properly restricting the shift of individual reels inside of the tape cassette, it is possible to prevent component parts of the reels from incurring damage via external shock.

According to still another embodiment of the present invention, by virtue of the formation of a plurality of slits, elastic deformation of the cylindrical members can be facilitated, thereby enhancing the actual effect for absorbing shock.

According to still another embodiment of the present invention, after completing a molding process, it is possible to easily extract the molded storing case out from the mold, thereby promoting the productivity of the storing case.

According to still another embodiment of the present invention, it is possible to secure sufficient elastic deformation of the cylindrical members via swollen tip portions, thereby enhancing the actual effect for absorbing shock.

According to still another embodiment of the present invention, when the tape cassette is shifted inside of the storing case, the tape cassette is brought into contact with the projected wall members. This in turn causes the projected wall members to elastically deform themselves to buffer shock components incurring to the tape cassette in parallel with the bottom plate and the ceiling plate of the tape cassette, thereby preventing the reels and component parts of the tape cassette from incurring unwanted damage inside the tape cassette.

According to still another embodiment of the present invention, the tape cassette comes into contact with projected wall members via projections formed on the internal surface on the upper edge side of the projected wall members to cause the projected wall members to elastically deform themselves by a greater amount to consequently enable the shock components incurring to the tape cassette in parallel with the bottom plate and the ceiling plate of the tape cassette to be more effectively buffered.

According to the tape cassette storing case in still another embodiment of the present invention, inasmuch as the junction portion comprises an outwardly projecting substantially circular-arc curve surface, even when the tape cassette falls with the junction portion facing the ground, the circular-arc curve surface elastically deforms to properly buffer shock incurring to the tape cassette.

Further, according to the tape cassette storing case in still another embodiment of the present invention, the ceiling plate of the lid body member and the bottom plate of the cubic body member are thinly extended out from the lateral wall members, where tip portions of these plates are inwardly bent to form external peripheral edge portions. Because of this arrangement, even when the storing case falls with the external peripheral edge portion facing the ground, irrespective of the falling posture of the storing case, the tip-end curve surface elastically deforms, thereby buffering the shock incurring to the tape cassette.

According to still another embodiment of the present invention, an inhibiting wall is disposed on the inner side of the tip-end curve surface of the external peripheral edge of the bottom plate so as to be close to the lateral wall of the lid body when being closed. Owing to this arrangement, dust particles are prevented from infiltrating into the storing case directly via the bottom end of the lateral walls, thus preventing any trouble from occurring due to infiltration of dust particles.

According to still another embodiment of the present invention, the cubic body and the lid body is locked by double by means of the side-locking member and the lateral-wall locking member, and yet, the side-locking member is subject to locking at a position inner from the tip end of the external peripheral edge portion. Owing to this arrangement, even when the fallen storing case incurs shock, the side-locking member is free from directly incurring shock, without the fear of causing the lid body to be opened via unlocking.

According to still another embodiment of the present invention, it is possible to promote handling utility via a single hand operation of an user while preventing the flap plate constituting one of the components of the side locking member from being torn off.

According to still another embodiment of the present invention, it is possible to further promote operating utility related to the opening and closing operation of the side-locking member.

Further, according to the tape cassette storing case in still another embodiment of the present invention, projected surface members are formed at least on a part of the bottom plate of the cubic body or on a part of the ceiling plate of the lid body in order that the projected surface members may be able to buffer vertical-directional components of shock force incurring to the tape cassette by elastically deforming the case in the vertical direction. Further, the projected wall members formed on the lateral walls of the cubic body are elastically deformed by the tape cassette shifting itself inside of the storing case. This in turn causes a shock force component incurring to the tape cassette in parallel with the bottom and ceiling plates of the tape cassette to be buffered. Further, when the storing case incurs shock via the lateral side, external peripheral edges of the bottom plate and the ceiling plate and the substantially circular-arc curve surface of the junction portion jointly generate elastic deformation, thereby properly buffering the shock incurring to the tape cassette. Concretely, even when the tape cassette incurs shock via any direction or even when falling itself irrespective of falling posture, the above-referred external peripheral edges and the circular-arc curve surface elastically deform themselves, thereby properly buffering the shock incurring to the tape cassette. Because of this, the tape wound on the reels is prevented from improperly being wound via deviation, and yet, reels and component parts of the tape cassette are prevented from incurring unwanted damage. In addition, inasmuch as the inventive tape cassette storing case is integrally molded with resinous material, it is possible to provide inexpensive storing cases.

BRIEF DESCRIPTION OF THE DRAWINGS

FIG. 19 explains the processes for producing the essential components of the tape cassette storing case according to the third embodiment of the present invention, wherein FIG. 19A is an explanation of a process for filling up resinous material, and FIG. 19B is and explanation of a process to pull back "sakinuki" (pull-out) pins, and FIG 19C is an explanation of a process for releasing a molded product out from a mold;

FIG. 25A designates a cross-sectional view along line XXV—XXV shown in FIG. 24, whereas FIG. 25-B designates a modified example;

DESCRIPTION OF THE PREFERRED EMBODIMENTS

Referring now to the accompanying drawings, practical forms for implementing the present invention are described below.

Figure 1:
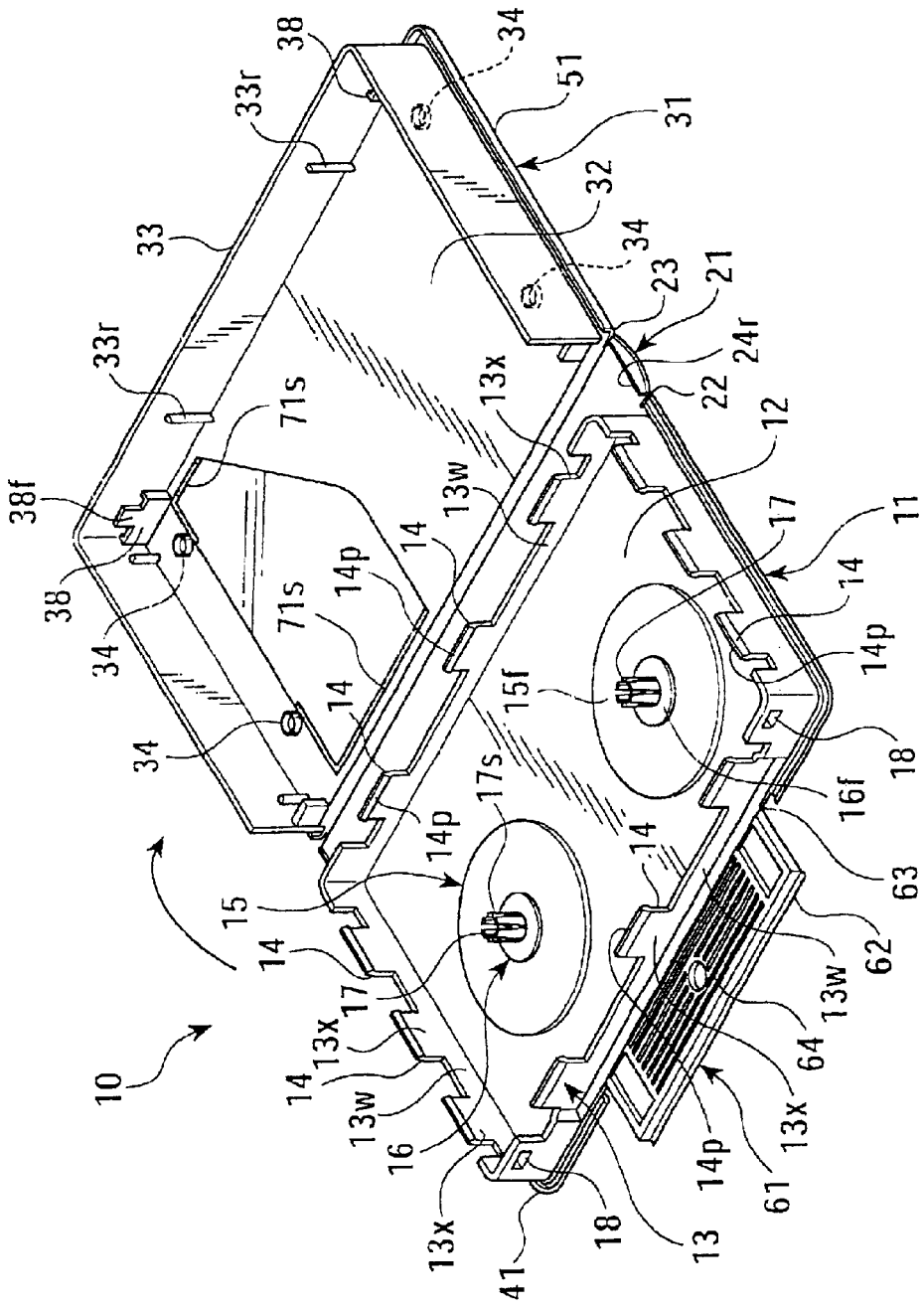
FIG. 1 designates an overall perspective view of a tape cassette storing case according to the first embodiment of the present invent invention.
Figure 2:
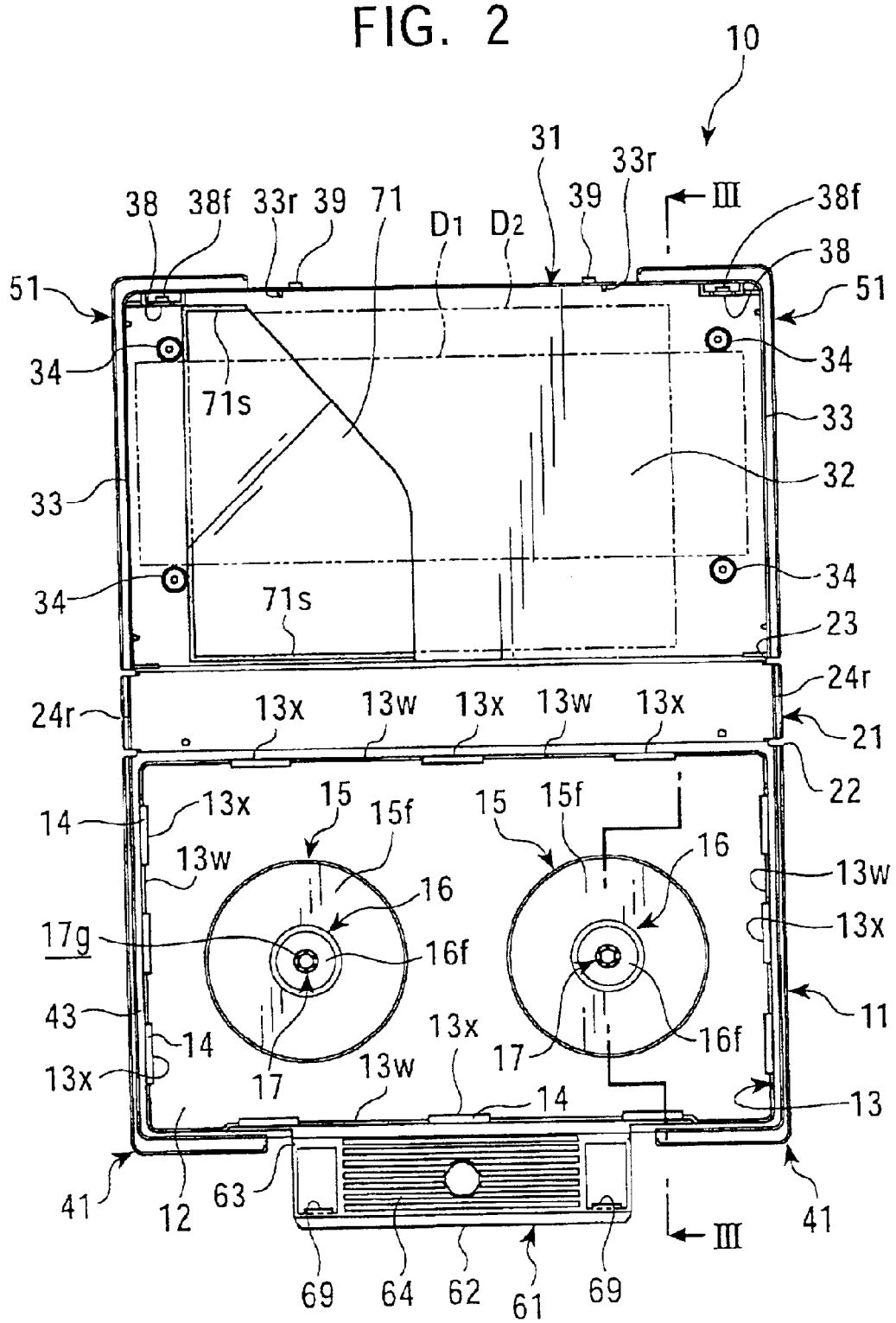
FIG. 2 designates a plan view of the tape cassette storing case shown in FIG. 1.
Figure 29A:
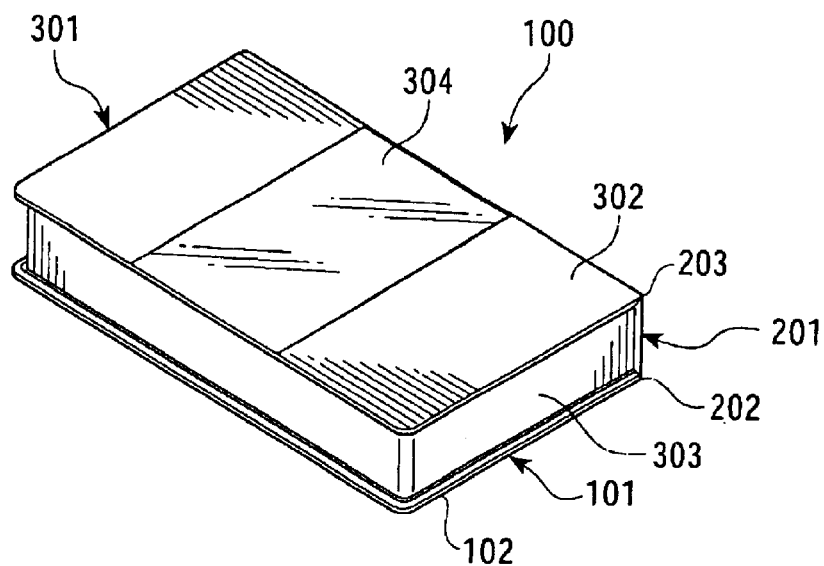
FIG. 29A designates an overall perspective view of a conventional tape cassette storing case while the lid member remains closed, whereas FIG. 29B designates the state in which the lid member remains open.
Figure 29B:
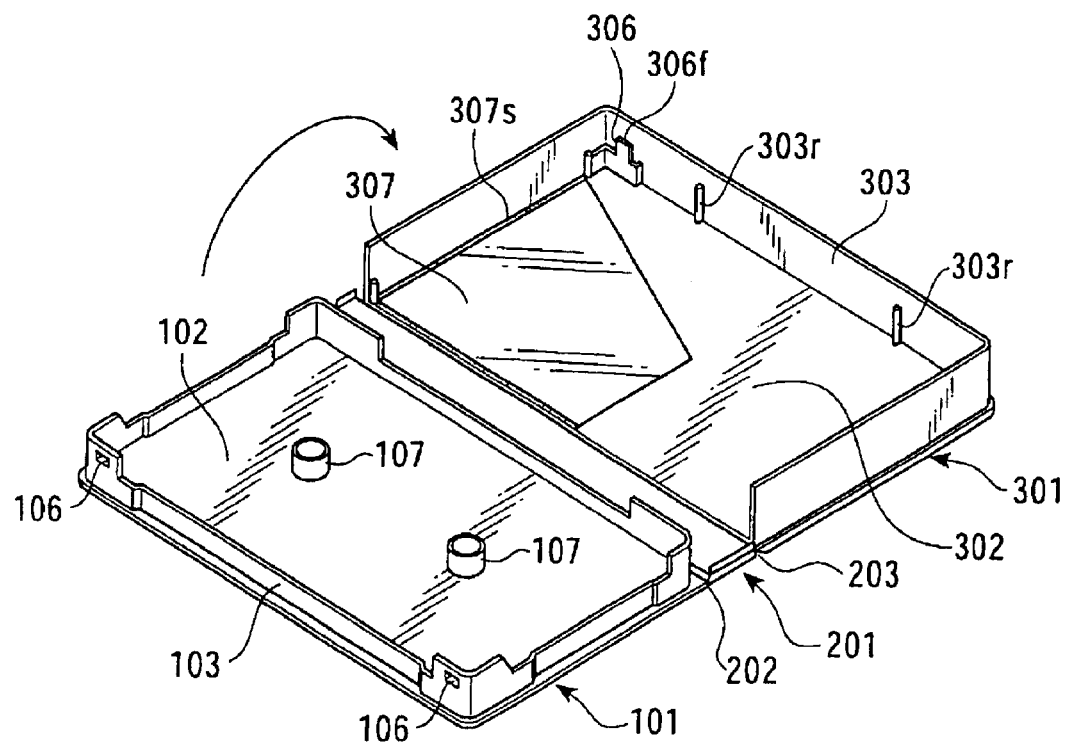
Figure 30:
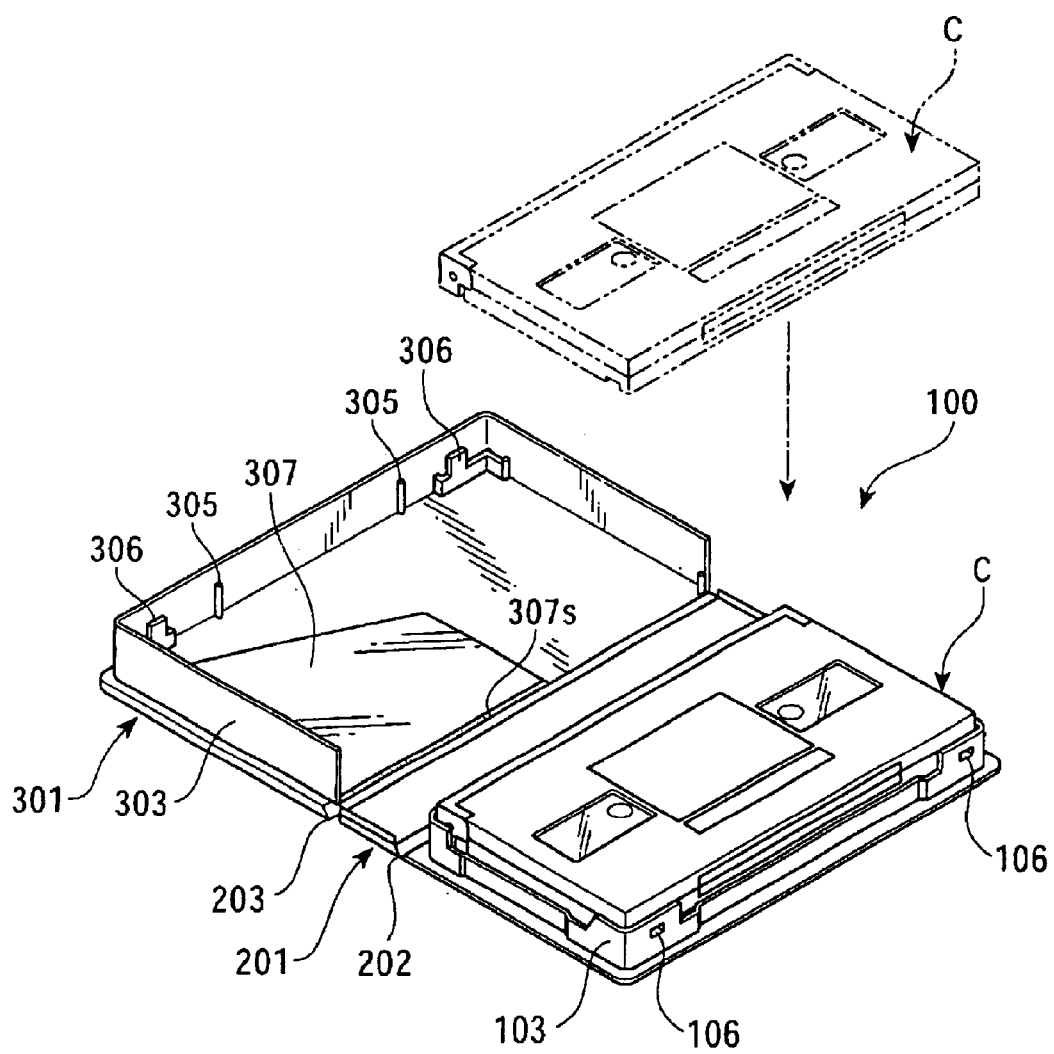
FIG. 30 designates an overall perspective view designating the state in which a tape cassette is stored in a conventional tape cassette storing case.

FIG. 1 is an overall perspective view for illustrating a state in which a lid member 31 is opened from a cubic body 11 of a tape cassette storing case 10 (this will be referred to as a storing case 10 in the following) according to the first practical form of the present invention. The state shown in FIG. 1 corresponds to the a conventional example shown in FIG. 29B. FIG. 2 is a plan view of the first practical form corresponding to the perspective view shown in FIG. 1. Neither FIG. 1 nor FIG. 2 show a tape cassette C that should be stored in the storing case 10. The storing case 10 is made from polypropylene material and includes a cubic body 11 fitted with four lateral walls 13, a lid body member 31 fitted with three lateral walls, and a junction member 21 that constitutes one of lateral walls of the lid body member 31 when closing the lid body member 31, where a bottom plate 12 of the cubic body 11 and a ceiling plate 32 of the lid body member 31 are linked with each other by means of a pair of hinges 22 and 23. While the lid body member 31 remains closed, a lateral wall 33 of the lid body member 31 is substantially abutted with the external surface of a lateral wall 13 of the cubic body 11.

As shown in FIG. 1 and FIG. 2, inside the lid body member, a pair of ribs 33r are disposed on the inner surface of the front-side lateral wall 33, being opposite from the junction member 21. In addition, a pair of lateral-wall locking members 38, each having a hook member 38f, are disposed at both end sections inside of the lid body member 31. When the lid body member 31 is closed, each of the hook members 38f is engaged with a corresponding stopper hole 18 formed in the lateral wall 13 from the inner side of the lateral wall 13 of the cubic body 11. As will be shown in FIG. 3 and FIG. 10 later on, the ceiling plate 32 is formed to be slightly lower in height than the upper edge of external peripheral surface of the lid body member 31. Inasmuch as the ceiling plate 32 constitutes an inwardly projecting large-area surface, it is possible for the ceiling plate 32 to elastically deform itself in the upper and lower directions. Further, four of the boss members 34 are formed on the internal four-corner surfaces of the ceiling plate 32, where the boss members 34 jointly come into contact with the upper surface of a tape cassette C, being stored so as to sustain the stored tape cassette C.

Continuous lateral walls 13 are formed along four sides of the cubic body 11. In order that four corners can constantly secure the right angle even when the four lateral walls 13 incur external force, the four lateral walls 13 are provided with a height and a thickness proper to the lateral wall 13. Concretely, the four-corner lateral walls consist of a low-height wall member 13w having a height substantially one-half the thickness of a tape cassette C to be stored and three projected wall members 13x that intermittently project themselves from a predetermined position of the upper edges of the low-height wall member and are elastically deformable themselves. Further, as will be shown in FIG. 3 later on, a projection 14 is formed on inner surface at the upper edge of each of the projected wall member 13x. Because of this arrangement, it is possible to generate an effect identical to the effect of forming the upper edges towards the inner side of the cubic body 11. Normally, those peripheral projections 14 are not closely abutted with a tape cassette C, but a certain interval free from obstructing the storage of the tape cassette C is formed. Based on the same meaning, an oblique surface 14p is formed at the tip portion of the projection 14, thereby facilitating storage of the tape cassette C. When shifting the tape cassette C inside the cubic body 11, initially, the tape cassette C is abutted with the projected wall members 13x via the projections 14, and thus, the projected wall members 13x are easily subject to elastic deformation, and then, the elastically deformed amount grows larger so as to effectively buffer the shock incurring to the tape cassette C.

Figure 3:
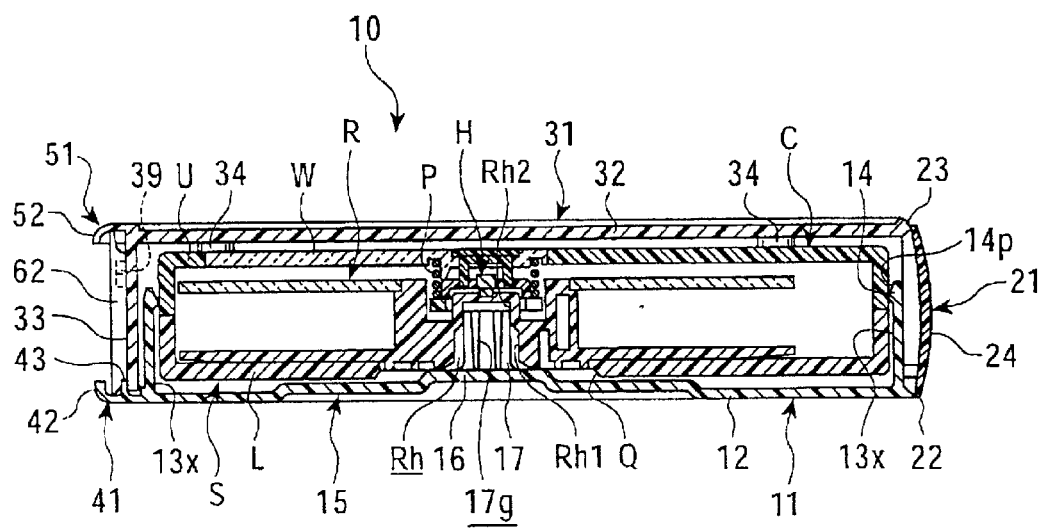
FIG. 3 designates a cross-sectional view along line III—III shown in FIG. 2 of the lid-closed tape cassette storing case according to the first embodiment of the present invention.

Further, as shown in FIG. 1 and FIG. 3, pair of lower-side, extremely low-height, circular-cone, trapezoidal projected surface portions 15 are formed on the bottom plate 12 of the cubic body 11 in concentricity with the reels R of the stored tape cassette C, as though those projected surface portions 15 were formed via an embossing process. In addition, a pair of upper-side projections 16 are formed by way of piling up the center of a pair of upper surfaces 15f. In addition, a pair of cylindrical members 17, each being provided with a slit formed in the height (length) direction, are erected at the center of each of the upper surfaces 16f of the upper-side projections 16. As shown in FIG. 3, it is so arranged that a slit width 17g expands itself in the direction of the tip end portion of each of the cylindrical members 17.

FIG. 3 designates, a cross-sectional view of the state in which a tape cassette C is stored inside the cubic body 11 of the storing case 10 with the lid body 31 being closed, which corresponds to the state along line III—III shown in FIG. 2. Shell member S of the tape cassette C comprises an upper shell member U that is partially fitted with a transparent window W and a lower shell member L that is fitted with a pair of reel-base inserting openings Q for allowing the insertion of the reel base ascending from a video tape recorder. A tape supplying reel (or a take-up reel) R is disposed inside of the shell member S in concentricity with a pair of reel-base inserting openings Q, where the tape supplying reel (or a take-up reel) is rotatably held by a reel holder H that is pressed by a coil spring P disposed between the upper shell U. The upper-side projected surface portion 16 of the double-stage projected surface portions comprising the lower-side projected surface portion 15 formed on the bottom plate 12 of the cubic body 11 and the upper-side projected surface portion 16 is inserted into the reel-base inserting opening Q, where the upper surface 16f of the upper-side projected surface portion is abutted with the bottom surface of the reel R. Further, the cylindrical member 17 erected at the center of the upper surface 16f of the upper-side projected surface portion 16 is idly inserted in a hub hole Rh of the reel R.

The hub hole Rh comprises a driving-pawl hole portion Rh1 formed with a reel-driving pawl on its internal peripheral surface and a reference hole portion Rh2 that is formed in concentricity with the driving pawl hole portion Rh1 and has a diameter smaller than that of the driving pawl hole portion Rh1. The cylindrical member 17 has a height arriving at the reference hole portion Rh2 (refer to FIG. 3).

Figure 8A:
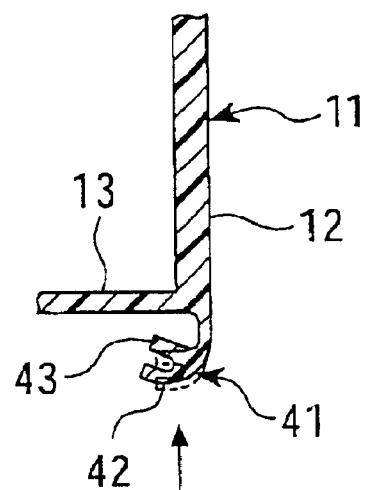
FIG. 8 designates a state in which shock incurring to the tape cassette storing case is buffered by deformation of an external peripheral edge portion projected out from a lateral wall, wherein FIG. 8A designates a deformed external peripheral edge portion on part of the bottom plate, and wherein FIG. 8B designates a deformed external peripheral edge portion on part of the ceiling plate.

Further, as shown in FIG. 3, a junction member 21 of the storing case 10 has a substantially circular arc form curved surface 24, where the curved surface outwardly projects between hinges 22 and 23. As shown in FIG. 1 and FIG. 2, a pair of ribs 24r, each having identical substantially circular-arc form edges, are discretely formed at both end portions. As shown in FIG. 2, except for the junction portion 21, the bottom plate 12 and the ceiling plate 32 outwardly project themselves as thinly formed plates out from the lateral wall 13 of the cubic body 11 and the lateral wall 33 of the lid body 31 in three directions (this arrangement is partly shown on the front side opposite from the junction portion 21 in FIG. 3). Further, as shown in FIG. 8 via an enlarged view, tip portions of the three directional projected thin plates are respectively inwardly bent with substantially circular-arc form (by one-quarter), whereby forming external peripheral edges 41 and 51 each having its own tip-end curved surfaces 42 and 52. FIG. 8A designates the external peripheral edge 41 on part of the cubic body 11, whereas FIG. 8-B designates the external peripheral edge 51 on part of the lid body member 31. More particularly, as shown in FIG. 8A, an inhibitory wall 43 is erected on the inner wall of the tip-end curved surface 42 along the external peripheral edge 41 on the part of the lid body member 11. This arrangement corresponds to the invention set forth in Claim 19. As shown in FIG. 3, it is so arranged that while the lid body member 31 is closed, the inhibitory wall 43 is at a position close to the external surface of the lateral walls 33 of the lid body member 31, thereby inhibiting dust particles from infiltrating into the storing case from the external peripheral edge 41 via the bottom portion of the lateral walls 33 of the lid body member 31.

Further, as shown in FIG. 1 and FIG. 2, by way of deleting the external peripheral edges 41 and 51, a side locking member 61 is disposed on the front side of the storing case 10 and is opposite from the junction portion 21. Concretely, the side locking member 61 is connected to the bottom plate of the cubic body 11 via a hinge 63. The side locking member 61 is fitted with a flap plate 62 attached with a flat reinforcing member 64. As shown in FIG. 3, when the flap plate 62 is placed below the lateral walls 33 of the closed lid body member 31, a pair of hook members 69 formed on the flap plate 62 are engaged with the corresponding stoppers 39 formed on the external surface of the lateral walls 33 of the lid body member 31.

Next, the functional operation of the inventive tape cassette storing case 10 featuring the above construction is described below.

Figure 5A:
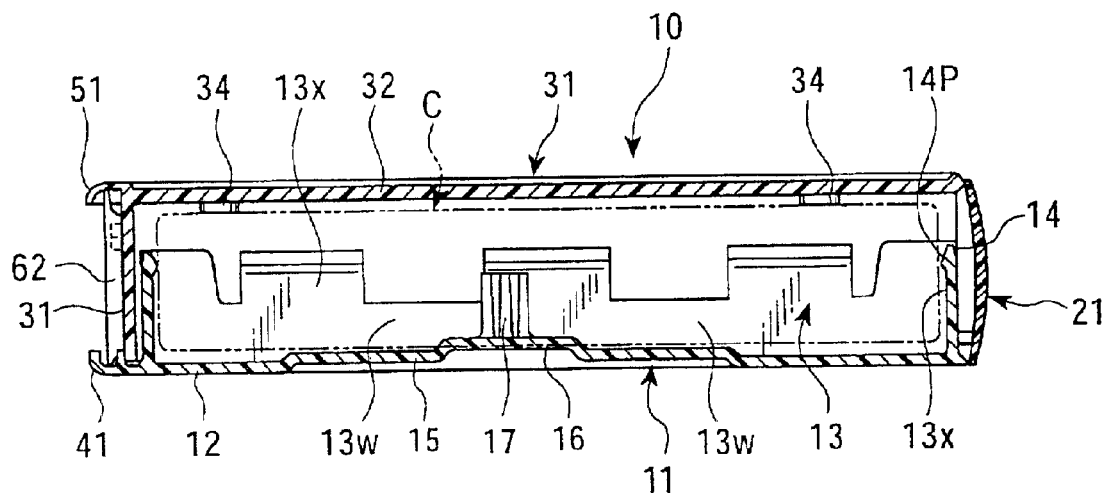
FIG. 5 designates a pair of cross-sectional views designating a state in which shock is buffered when the tape cassette storing case according to the first embodiment of the present invention falls with the bottom surface facing the ground wherein FIG. 5A designates the state before incurring a shock, and wherein FIG. 5B designates the state in which shock is buffered by elastic deformation of a projected surface portion formed at the junction portion.
Figure 5B:
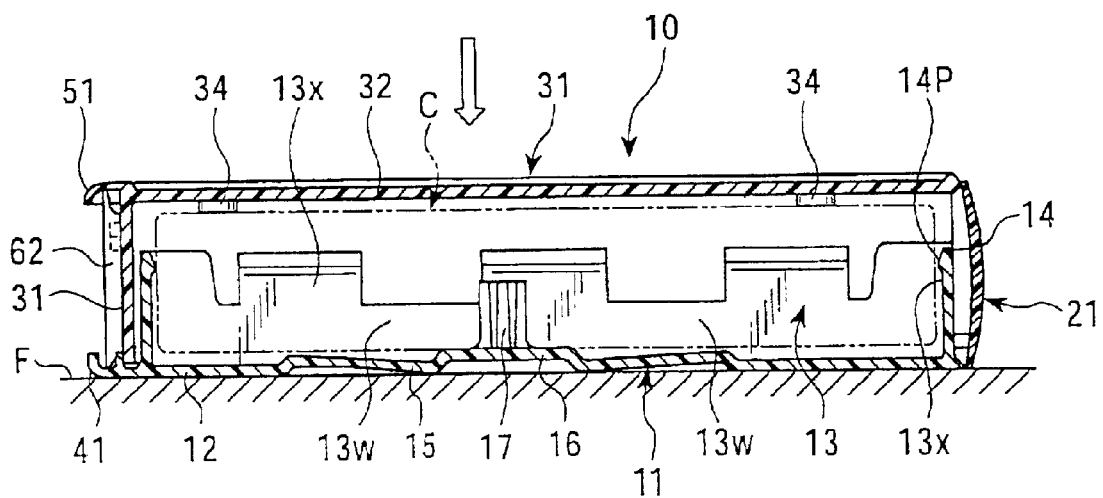

Vertical-directional (in an up-down direction) shock incurring to a tape cassette C is absorbed and buffered by the vertical-directional elastic deformation of the lower-side projected surface portions 15 that are integrated with the upper-side projected surface portions 16 for holding the tape cassette C. FIG 5A and 5B respectively designate cross-sectional views for exemplifying the above functional aspect. To simplify the illustration, an external aspect of the tape cassette C stored in the storing case 10 is merely designated by a one-dot chained line. The same applies to the following sectional views. FIG 5A designates a state in which the storing case 10 is on the way of falling with the bottom surface 12 facing the floor F, in other words, before the storing case 10 actually incurs shock FIG. 5B designates a state in which the storing case 10 has fallen onto the floor F. Concretely, as soon as the storing case 10 hits against the floor F, the lower-side projected surface portion 15 deforms itself, thereby buffering shock incurring to the tape cassette C. Inasmuch as the tape cassette C is held by the ceiling plate 32 comprising an elastically deformable projected surface portion across a pair of boss members 34, shock incurring to the tape cassette C is simultaneously buffered via the elastically deformed ceiling plate 32.

Figure 6A:
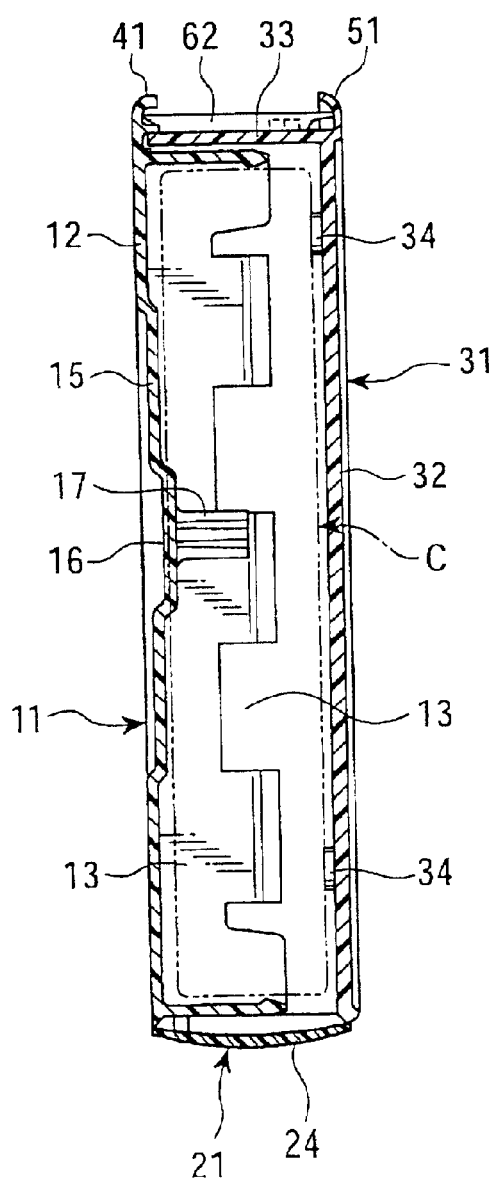
FIG. 6 designates a pair of cross-sectional views designating a state in which the tape cassette storing case according to the first embodiment of the present invention falls with the junction portion facing the ground, wherein FIG. 6A designates the state before incurring a shock, and wherein FIG. 6B designates such a state in which shock incurring to the junction portion is buffered by elastic deformation of a projected surface portion of the junction and also by elastic deformation of a projected wall portion.
Figure 6B:
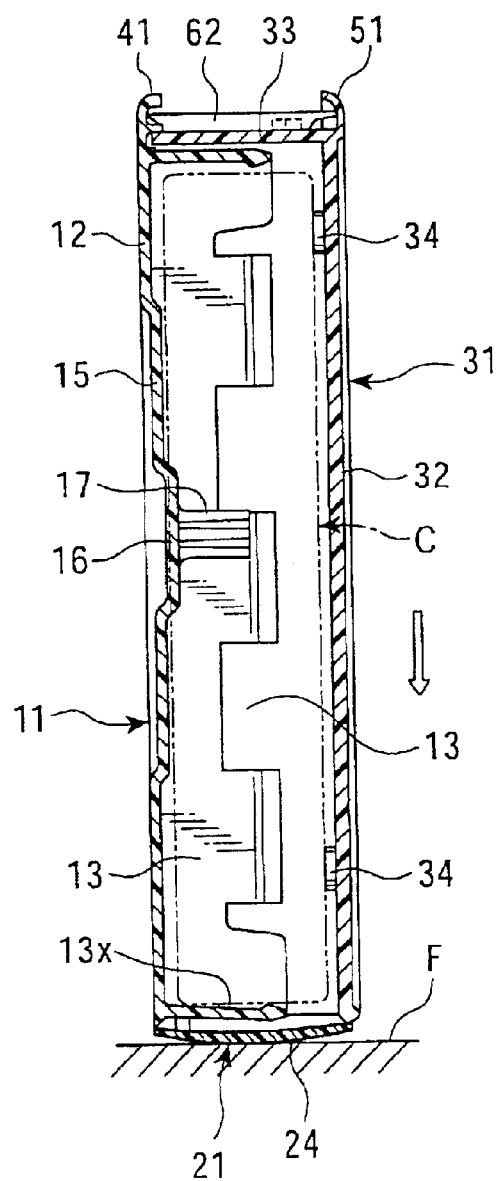

FIG. 6A and 6B respectively designate a cross-sectional view for exemplifying a case in which the storing case 10 falls with the junction portion 21 facing the floor F. FIG. 6A designates the state before the storing case incurs shock. FIG. 6B designates the state in which the storing case has actually fallen onto the floor F. Concretely, simultaneous with a collision with the floor F, the circular arc form curved surface 24 of the junction portion 21 is leveled off, thereby buffering shock incurring to the tape cassette C. Normally, the leveling action of the curved surface 24 corresponds to such deformation within elastic limit, and thus, the leveled surface properly restores the original circular-arc curved surface 24.

When the storing case has actually incurred shock, the tape cassette C is brought into contact with a projected wall portion 13x on the part of the junction portion 21 via a projected portion 14. Simultaneously, the projected wall portion 13x downwardly bends itself within the elastic limit, thereby buffering shock incurring to the tape cassette C.

Further, when the tape cassette C is shifted in the direction parallel to the bottom plate 12, the cylindrical member 17 being idly inserted in the hub-hole Rh of the reels inside of the tape cassette C is brought into contact with the hub-hole Rh and then elastically deforms itself, thereby buffering shock incurring to the tape cassette C. When this condition exists, the cylindrical member 17 has already risen to a height enough to arrive at the reference hole portion Rh2 of the hub hole Rh (refer to FIG. 3), and thus, the cylindrical member 17 elastically deforms itself at the tip portion abutted with the reference hole portion Rh2. Because of this action, the whole of the cylindrical member 17 easily becomes elastically deformable, thus improving the shock buffering efficiency.

Figure 7:
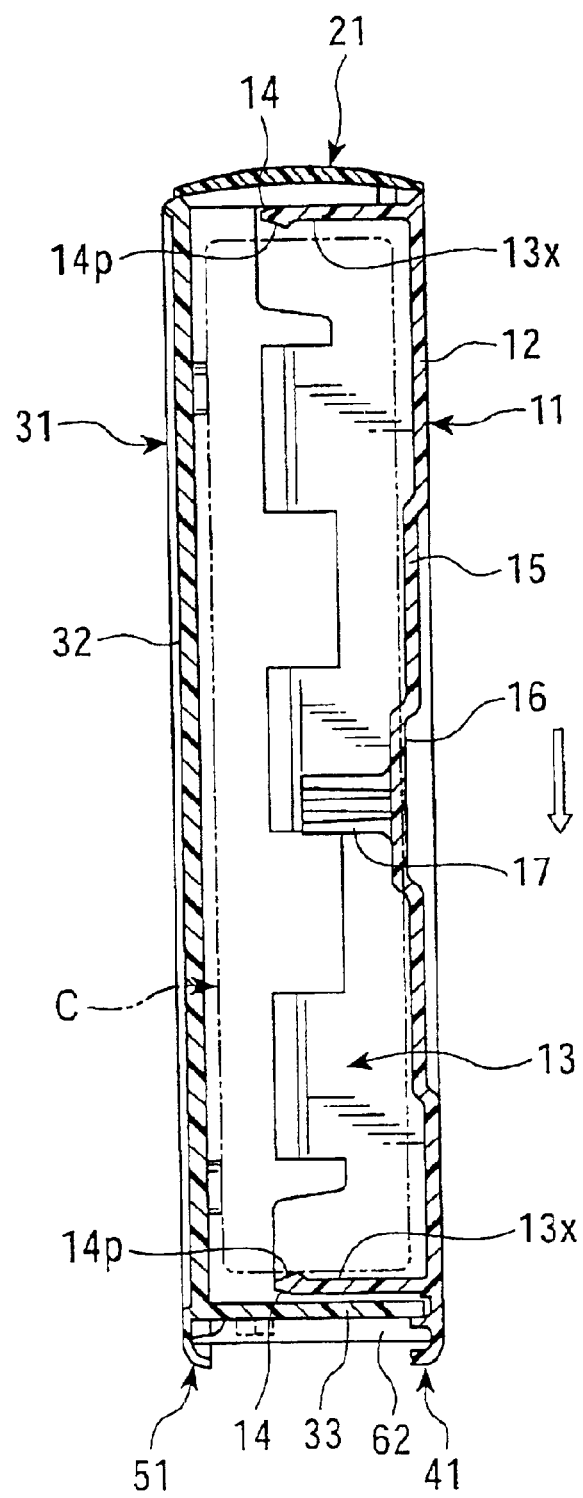
FIG. 7 designates another cross-sectional view designating a state in which the tape cassette storing case according to the first embodiment of the present invention falls with the front-side lateral wall facing the ground.
Figure 8B:
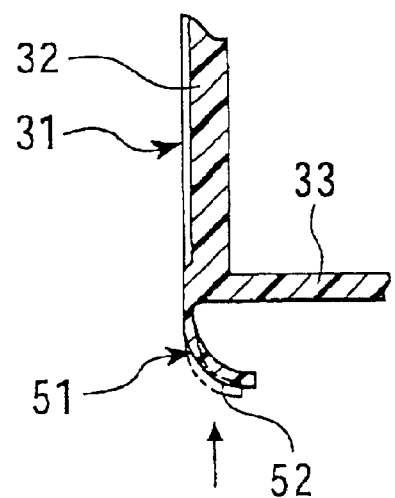

FIG. 7 designates a cross-sectional view for exemplifying a case in which the storing case 10 falls with the external peripheral edges 41 and 51 facing the floor. FIG. 8A and 8B respectively designate a cross-sectional view for exemplifying a case in which the external peripheral edges 41 and 51 have respectively deformed themselves after being hit against the floor surface. Concretely, FIG. 8A designates the deformed condition of the external peripheral edge 41 on the part of the cubic body 11. FIG. 8B designates the deformed condition of the external peripheral edge 51 on the part of the lid body member 31 caused by the falling direction and the impact force incurring thereto.

Figure 9A:
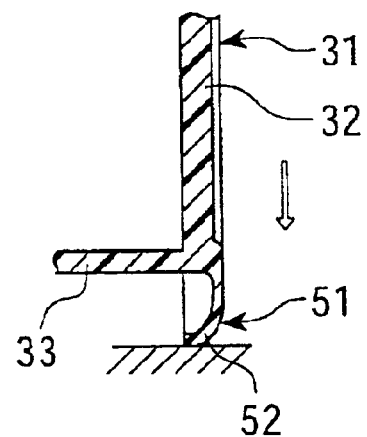
FIG. 9 designates three aspects of cross-sectional views designating a state in which shock incurring to a curved surface at the tip of the external peripheral edge is buffered when the inventive tape cassette storing case falls via a broad range of falling angles by way of exemplifying external peripheral edges on the part of the ceiling plate thereof; wherein FIG. 9A, FIG. 9B, and FIG. 9C respectively denote different falling angles.
Figure 9B:
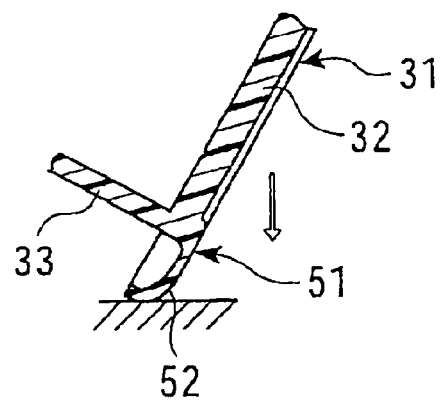
Figure 9C:
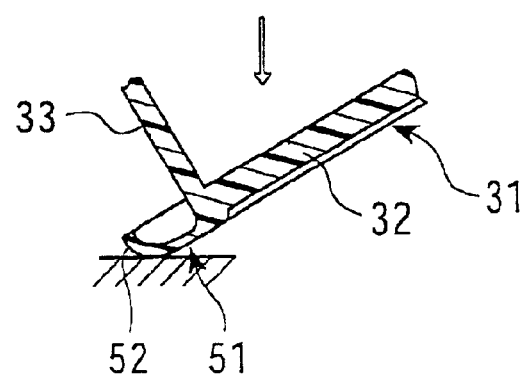

FIG. 9A to FIG. 9C respectively designate cross-sectional views for exemplifying the external peripheral edge 51, which is capable of properly absorbing shock via elastic deformation of the tip-end curved surface 52 of the external peripheral edge 51 in compatibility with extensive falling angles, even when the inclined angles of the falling storing case 10 are different from each other, as shown in FIG. 9A, FIG. 9B, and FIG. 9C. As shown in FIG. 7, when this condition exists, the tape cassette C is brought into contact with the front-side projected wall member 13x and the cylindrical member 17 being idly inserted in the hub-hole Rh via the projection 14 to cause the projected wall member 13x and the cylindrical member 17 to be bent downwardly, thereby buffering shock incurring to the tape cassette C.

Further, as shown in FIG. 3, the inhibiting wall 43 is disposed inside of the tip-end curved surface 42 at the position at which the closed lid body member 31 approaches the external surface of the lateral walls 33. Because of this arrangement, dust particles are prevented from infiltrating into the storing case 10 from the external peripheral edge 41 directly via the bottom of the lateral walls 33.

Figure 10:
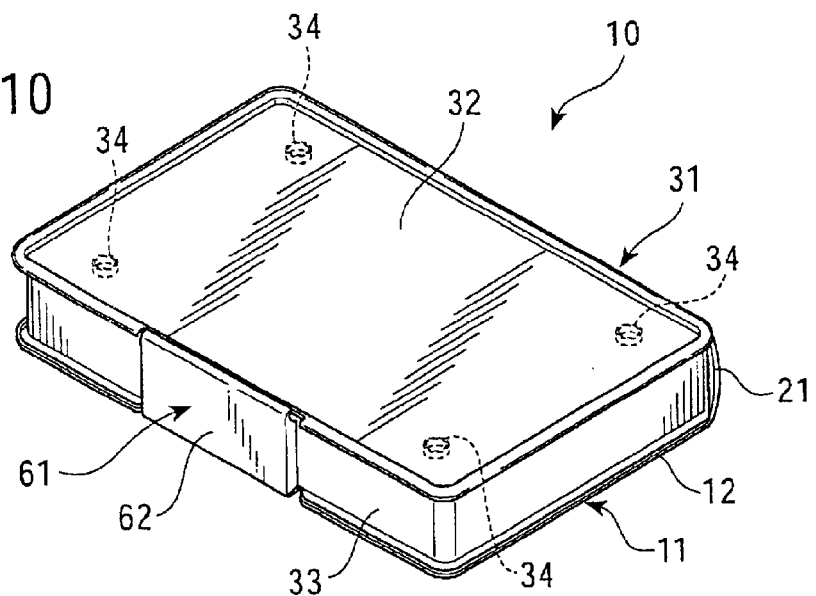
FIG 10 designates an overall perspective view of the lid-closed tape cassette storing case according to the first embodiment of the present invention.

FIG. 10 designates an overall perspective view of the storing case 10 with the lid body member 31 being closed. This perspective view corresponds to a conventional example shown in FIG. 29A. As shown in FIG. 10, the ceiling plate 32 of the lid body member 31 consists of a projected surface portion slightly lowered in the downward (inward) direction from the external, peripheral, upper edge, of the lid body member 31, and yet, four of the boss members 34 are disposed at four corners on the internal surface of the ceiling plate 32.

Figure 11A:
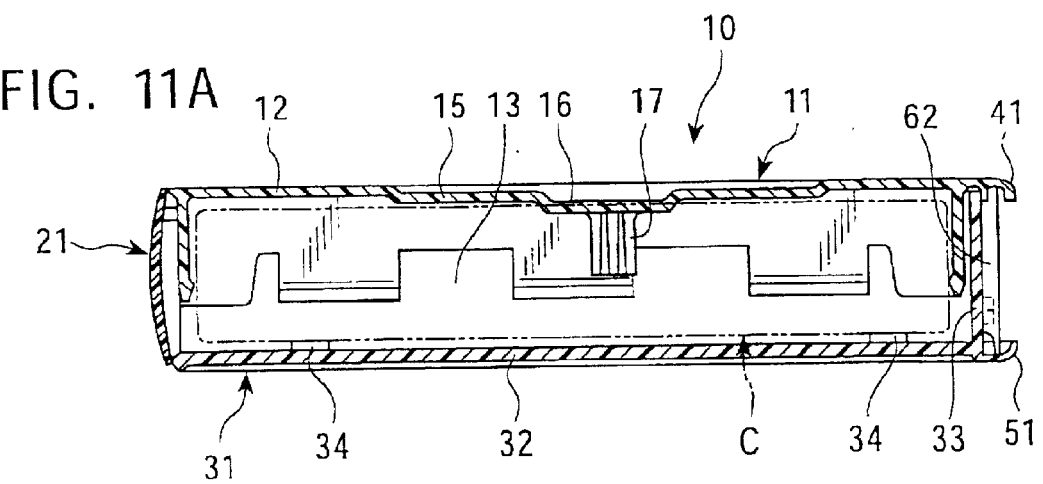
FIG. 11 designates a pair of cross-sectional views designating a state in which shock incurring to the tape cassette storing case according to the first embodiment of the present invention is buffered when it falls with the lid member facing the ground.
Figure 11B:
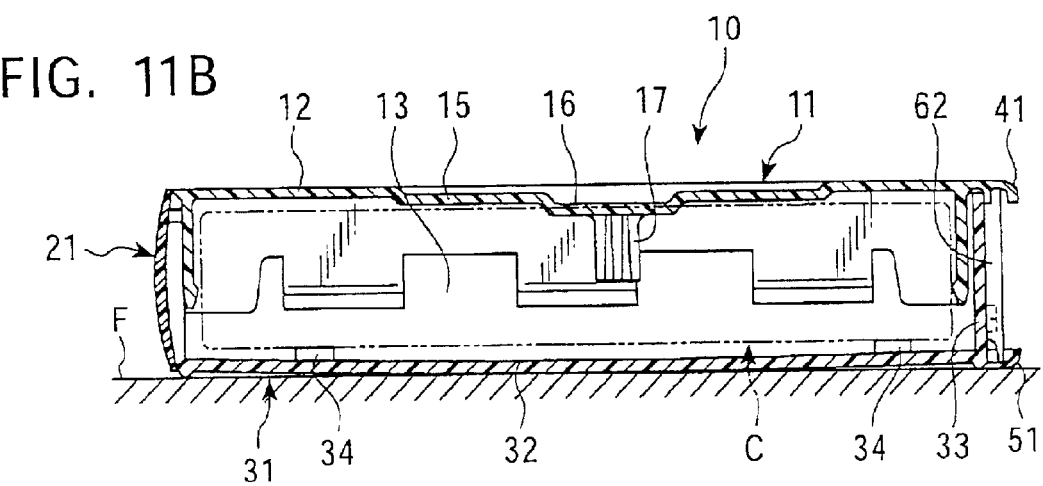

FIG. 11A and 11B designate a cross sectional view for exemplifying a case in which the storing case 10 falls with the ceiling plate facing the floor F. FIG. 11A designates the state before the storing case 11 incurs shock, whereas FIG. 11B designates the state in which the storing case 10 hits against the floor F, thereby causing an impact load of the tape cassette C to be transferred to the ceiling plate 32 via the boss members 34, and then, the ceiling plate 32 bends itself downwards to buffer shock incurring to the tape cassette C. Note that the shallow recess on the surface of the ceiling plate 32 shown in FIG. 10 may be utilized for adhering labels thereto.

Further, by way of utilizing the boss members 34 disposed at four corners on the internal surface of the ceiling plate 32 of the lid body member 31 shown in FIG. 2 as the positioning material, by fusing a transparent film or a transparent sheet via a peripheral linear portion 71s without fusing the center portion thereof, it is possible to form a pocket 71 for accommodating a slender recording card D1, shown via a one-dot chained line, or a large-area recording card D2, shown via a two-dot chained line, thereby simplifying the fusing process. Even when deleting the boss members 34, it is also possible to utilize the edges of the ceiling plate 32 for positioning by applying a jig.

Figure 12:
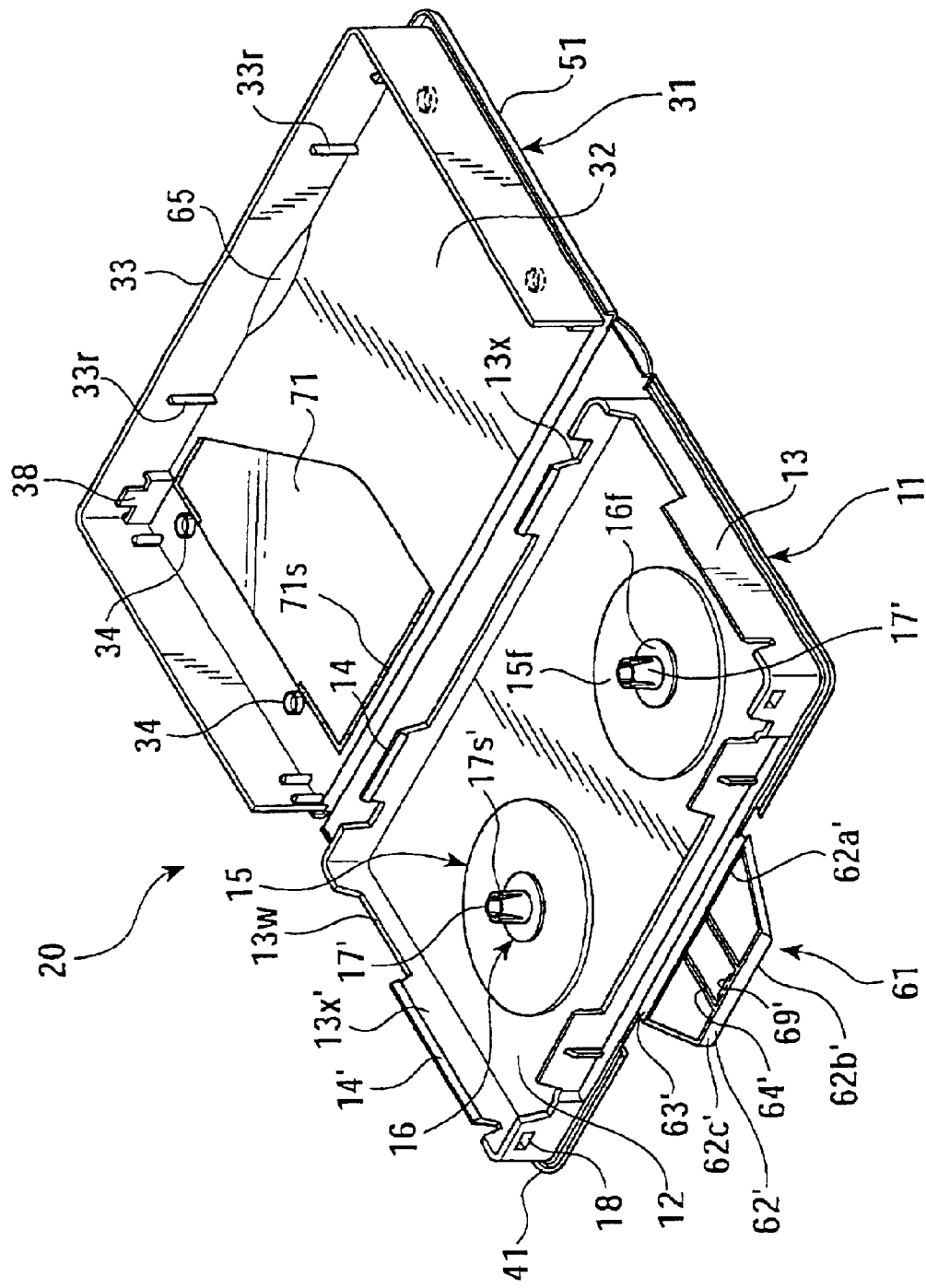
FIG. 12 designates an overall perspective view of the tape cassette storing case according to the second embodiment of the present invention designating a state in which the lid member remains open.

FIG. 12 designates an overall perspective view of a tape cassette storing case 20 according to the second embodiment of the present invention. Those components shown in FIG. 12 corresponding to those that are used for implementing the first embodiment of the present invention are respectively designated by identical reference numerals. Reference numerals of those components added with variation of forms are suffixed with a symbol (').

In the tape cassette storing case 20 according to the present embodiment, it is so arranged that four slits 17s' are formed in a cylindrical member 17', and yet, the length of the slits 17' is slightly contracted. A projection 14' is formed on the inner surface of an upper edge of a projected wall member 13x' formed along a lateral wall 13 of the cubic body 11. Further, a trapezoidal-form flap plate 62' constitutes a side locking member 61. As a whole, the projection 14' has such a curve bending more than that of the projection 14 used for implementing the first embodiment. However, there is no difference in the substantial effect of operation caused by the difference of shape. Further, it is so arranged that the share held by the projected wall member 13x' against the lateral wall member 13 in the second embodiment is equivalent to the share held by the projected wall member 13x against the lateral wall member 13 in the above-described first embodiment of the present invention. Because of this arrangement, the second embodiment may be able to provide an effect substantially identical to that provided by the first embodiment of the present invention.

Inasmuch as the cylindrical member 17' is provided with a decreased number of slits 17s', and yet, inasmuch as the length of the slits 17s' is slightly shorter than that of the first embodiment, overall rigidity of the cylindrical member 17' has been promoted, and thus, construction of the second embodiment is applicable to the formation of a case for storing a heavier tape cassette than is normally used for general consumers.

Figure 13:
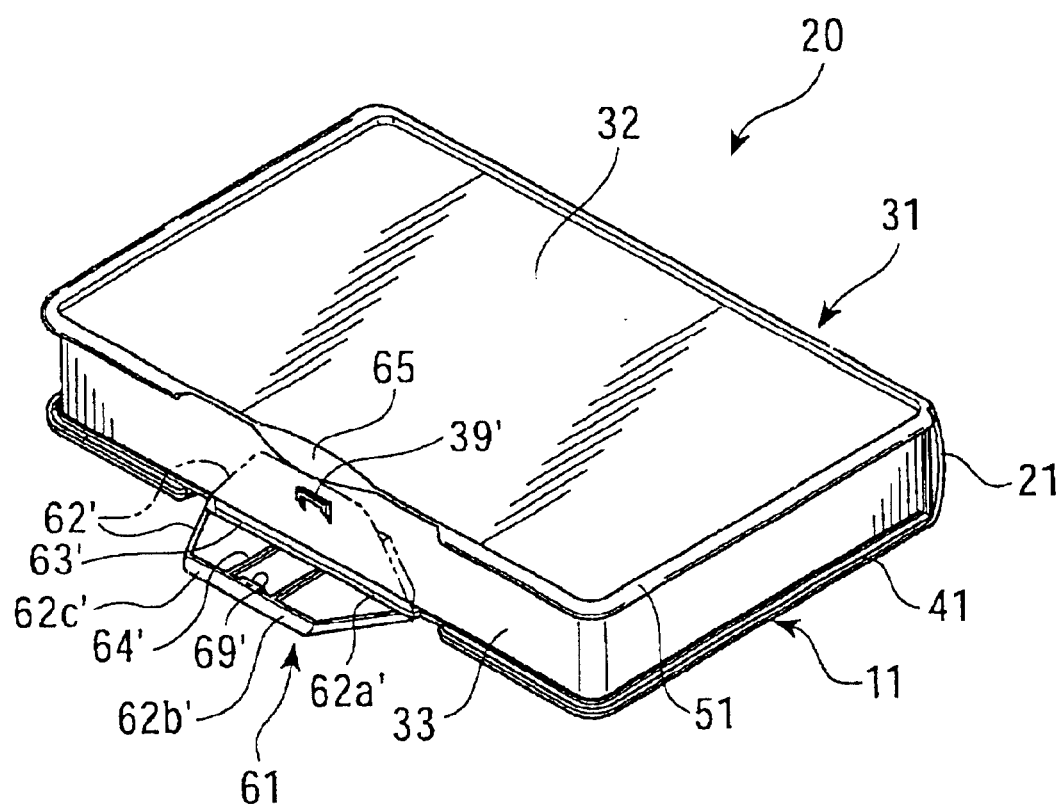
FIG. 13 designates an overall perspective view of the tape cassette storing case according to the second embodiment of the present invention designating a state in which is lid member is closed.

Referring to the construction of the flap plate 62', an edge-side portion 62a' on the part of a hinge 63' is arranged to be longer than another edge-side portion 62b' on the part of the external edge portion opposite from the hinge 63', thereby forming a trapezoidal flap plate 62'. In addition, a reinforcing rib 64' is integrally formed. As shown in FIG. 13, a single stopper member 39' is integrally formed on the front-side lateral wall member 33 of the lid body member 31. As shown via a one-dot chained line in FIG. 13, while the flap plate 62' is at the position for locking the storing case 20, the stopper member 39' is engaged with a hook member 69' of the flap plate 62' to retain the locked condition, thereby exerting a function to double-lock the tape cassette storing case 20 in conjunction with a lateral-wall locking member 38 shown in FIG. 12. Further, by way of partially deleting a corner portion between the lateral wall member 33 fitted with the stopper member 39' and the ceiling plate 32, a recessed portion 65 having an opening large enough to allow insertion of a finger is formed. While the flap plate 62' remains engaged, such a thinly formed inner surface 62c on the part of the edge-side portion 62b' of the flap plate 62' is externally exposed.

By virtue of the above arrangement in which the stopper member 39' is disposed at a single location, it is possible for an user to unlock the flap plate 62' with a single hand operation. Even when it is required to strengthen the engaging action of the stopper 39' in order to secure as much locking force as that which can be secured by the first embodiment, owing to the formation of a recessed portion 65, it is possible to expand the area for allowing an user's finger to come into contact with the inner surface 62c' of the flap plate 62' without causing the edge side portion 62b' of the flap plate 62' to outwardly project itself to a great extent. In addition, inasmuch as the extendable length of the edge side portion 62b' is contracted by an amount without causing the edge-side portion 62b' to be bet, proper performance of the flap plate 62' can be preserved. Further, inasmuch as the edge side portion 62a' is arranged to be of a trapezoidal form longer than the other edge side portion 62b', it is possible to extend the length of the hinge 63', thereby making it possible to minimize the fear of causing the flap plate 62' to be tom off.

Figure 14:
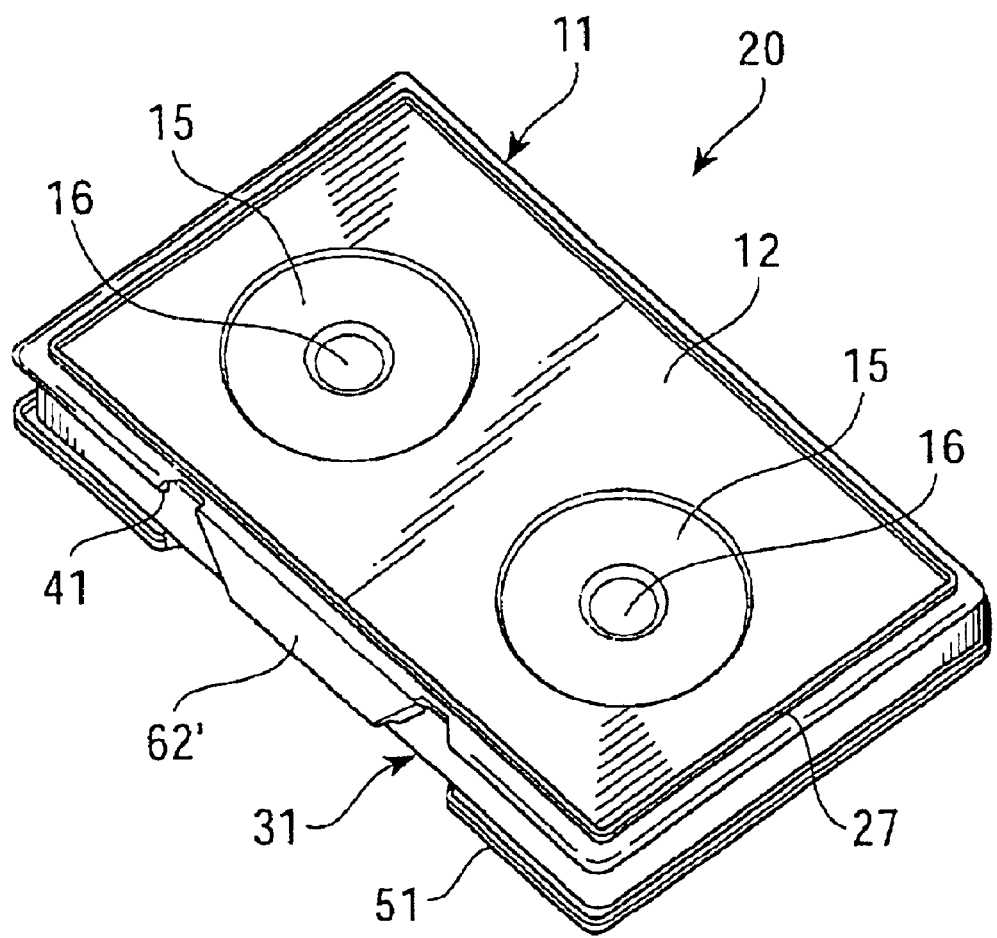
FIG. 14 designates an overall perspective view of the tape cassette storing case according to the second embodiment of the present invention designating a bottom surface of the cubic body.
Figure 15:
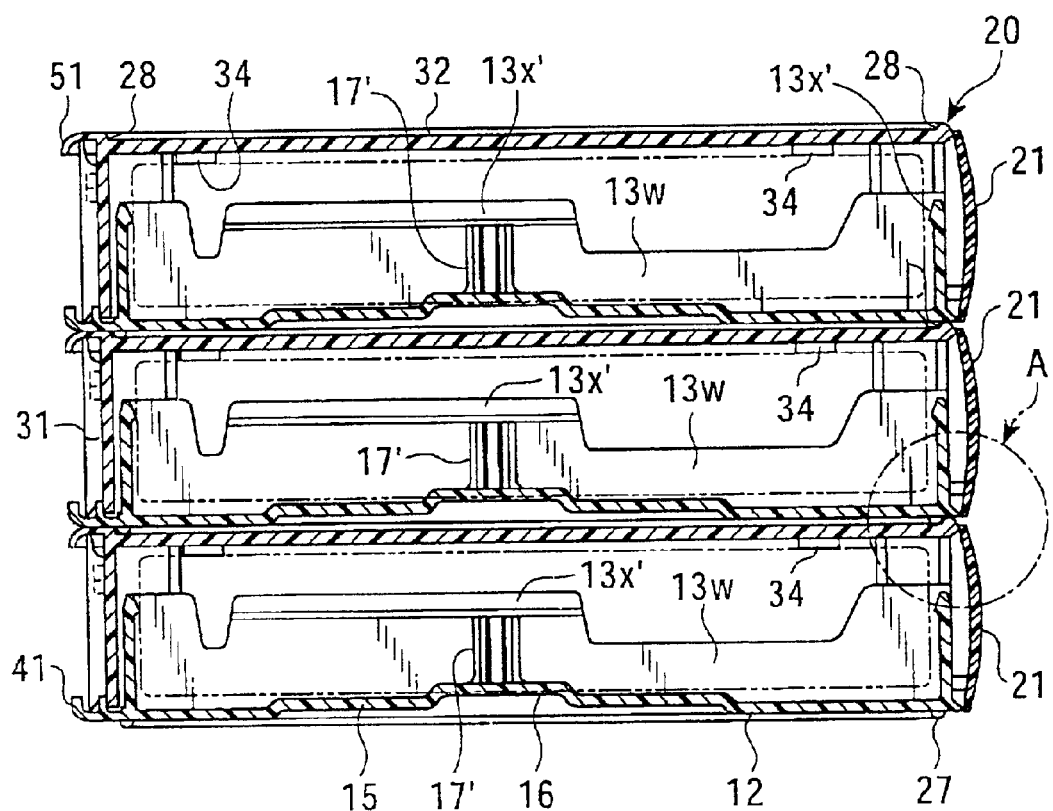
FIG. 15 designates a lateral sectional view designating a state in which a plurality of the tape cassette storing cases according to the second embodiment of the present invention are superposed.
Figure 16:
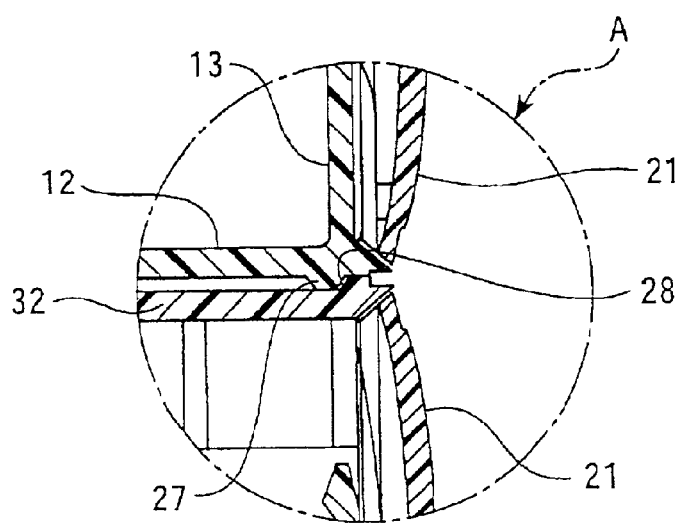
FIG. 16 designates an enlarged view of the portion A shown in FIG. 15.

Referring now to the tape cassette storing case 20 according to the second embodiment of the present invention, as shown in FIG. 14 to FIG. 16, a base member 27 is disposed on a part of external surface of the bottom plate 12 so as to be projected As shown in FIG. 14, the base member 27 is continuously formed along the peripheral edge of the bottom plate 12. Instead of this, the base member 27 also may be disposed intermittently. As shown in FIG. 16, the base member 27 is disposed at a position inner from the peripheral stepped edge portion 28 on the external surface of the ceiling plate 32. Owing to this arrangement, even when superposing a plurality of storing cases 20 in the vertical direction, the base member 27 and the peripheral stepped edge portion 28 remain in the mutually engaged relationship. This effectively prevents the supposed storing cases 20 from deviating from proper positions or collapsing via unwanted vibration.

Referring now to FIG. 17 to FIG. 20, the third embodiment of the present invention is described below. Those components shown therein corresponding to those of the first embodiment are respectively designated by identical reference numerals, and thus, a description of them will be omitted. In the third embodiment of the present invention, the configuration of a cylindrical member 55 erected on the upper surface of an upper-side projected surface portion 16 of the bottom plate 12 differs from that of the cylindrical members 17 and 17' provided for the first and second embodiments.

Figure 17A:
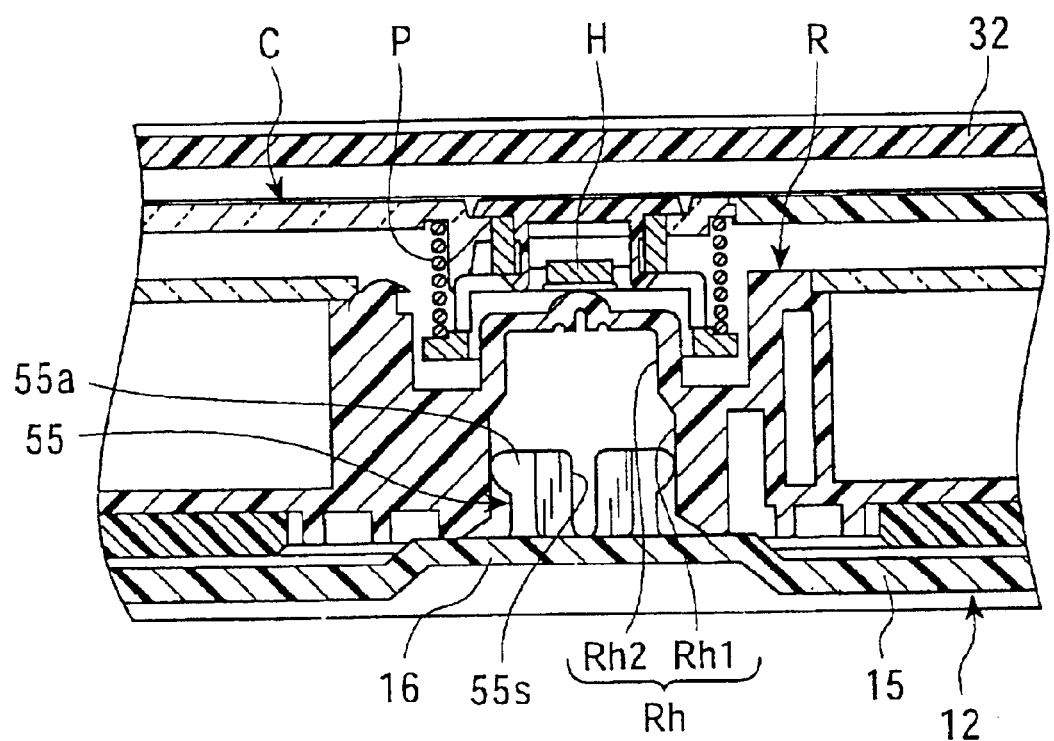
FIG. 17A designates a lateral sectional view designating essential components of the tape cassette storing case according to the third embodiment of the present invention.
Figure 17B:
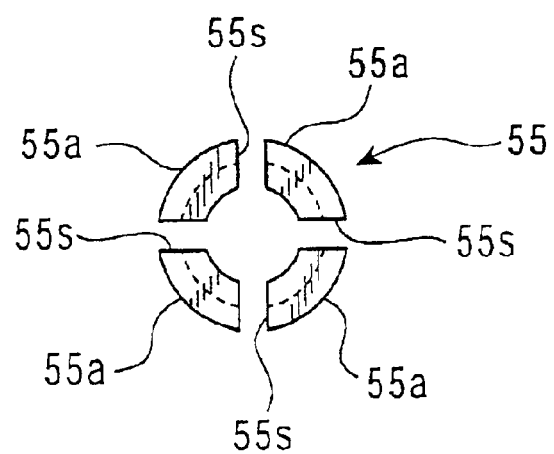
FIG. 17B designates a plan view of the cylindrical members formed therein.
Figure 18A:
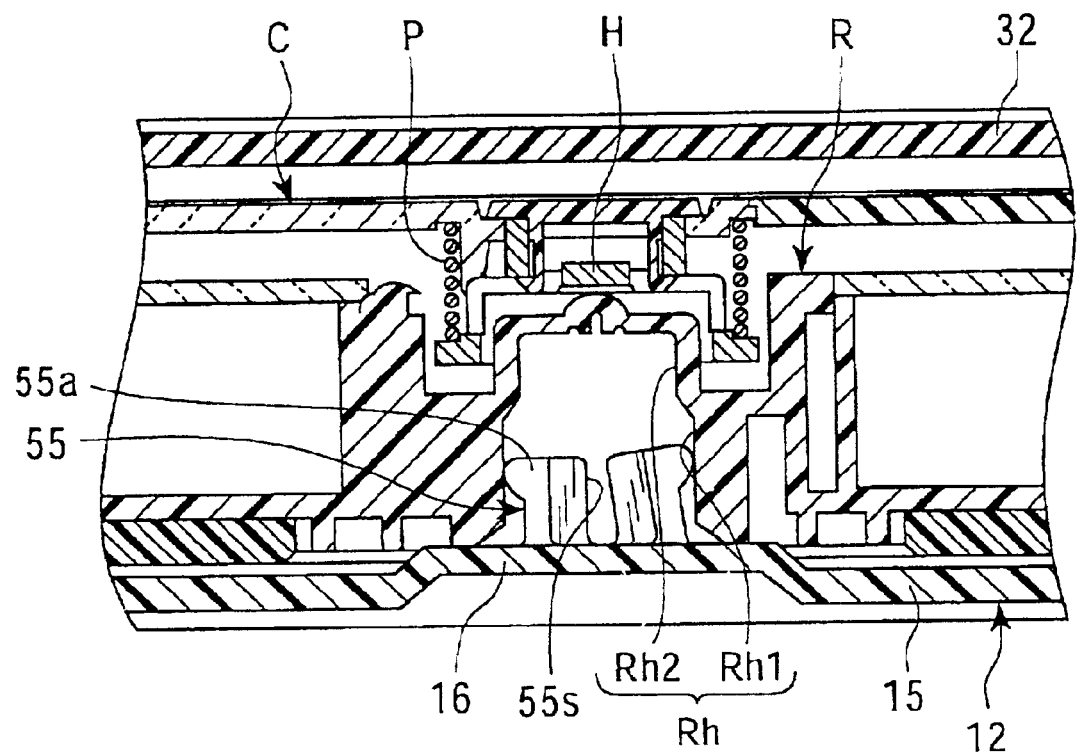
FIG 18A designates a lateral sectional view for explaining the function of the essential components of the tape cassette storing case according to the third embodiment of the present invention.
Figure 18B:
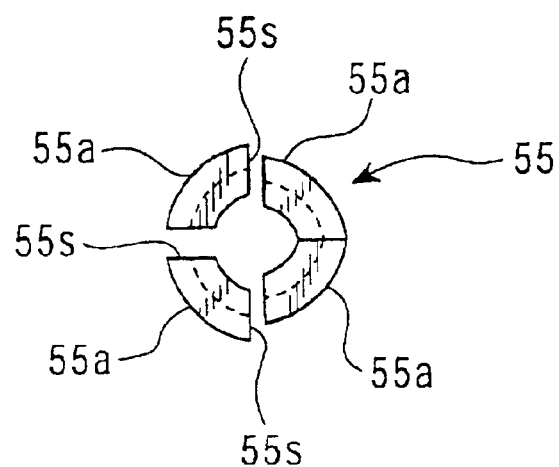
FIG. 18B designates a plan view of the cylindrical members formed therein.

As shown in FIG. 17, the cylindrical member 55 is split into four parts in the circumferential direction by mans of four slits 55s. As shown in FIG. 17B, four substantially spherical projected members 55a are outwardly formed on the tip portions of the split cylindrical members 55. Each of the spherical projected members 55a is disposed at a location opposite from a driving pawl hole portion Rh1 of a hub hole Rh. Because of this, when the reel R is shifted inside the tape cassette C by the effect of external shock as shown in FIG. 18, the driving pawl hole Rh1 is brought into contact with the projected members 55a of the cylindrical member 55 to cause the cylindrical member 55 to deform itself elastically, thereby properly buffering shock.

In order to cause the cylindrical member 55 to easily deform itself elastically, the third embodiment specifically provides four of the above spherical projected members 55a at the tip portion of the cylindrical member 55 to position them to be abutted with the hub hole Rh. It is so arranged that the third embodiment will be able to secure an effect identical to that which can be secured in the f embodiment of the present invention.

Figure 20A:
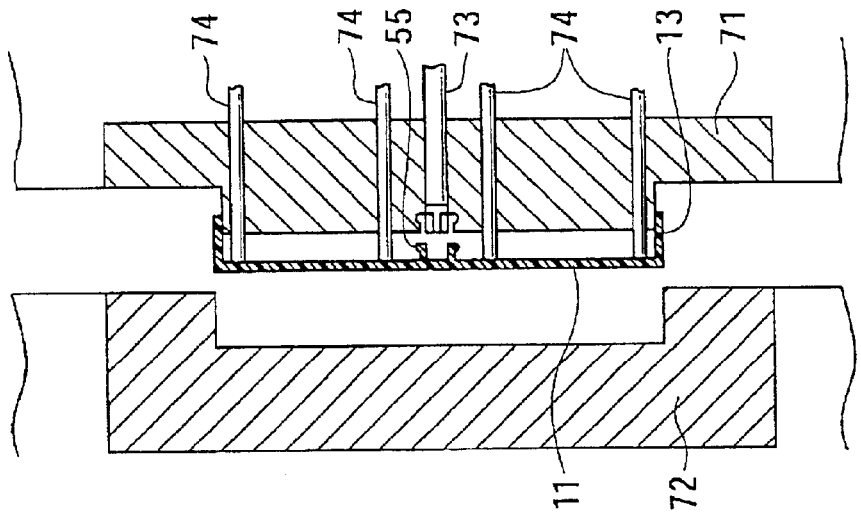
FIG. 20 is an explaination of processes for the production of essential components of the tape cassette storing case according to the third embodiment of the present invention, wherein FIG. 20A designates a state in which a molded product is extruded, and wherein FIG. 20B designates the state in which extrusion of the molded product has been completed.
Figure 20B:
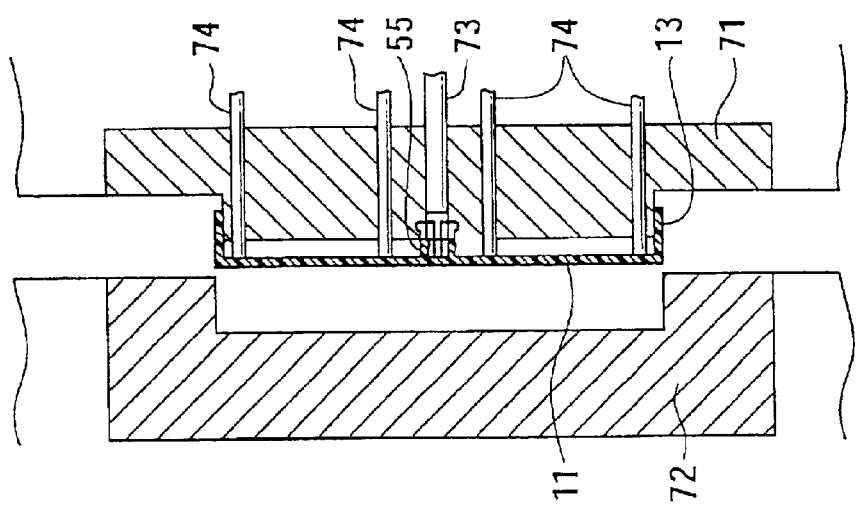

FIG. 19A, FIG. 19B, FIG. 19C, FIG. 20A and FIG. 20B, schematically illustrate serial processes for manufacturing the above-referred cylindrical member 55. These drawings denote the positional relationship in the production of the cubic body 11 by way of filling a cavity comprising a movable mold 71 and a fixed mold 72 with resinous material M. To simplify the illustration, projected surface portions 15 and 16 are deleted Initially, resinous material M is cured as shown in FIG. 19A. Net, as shown in FIG. 19B, a "sakinuki" pin (pull-out pin) 73 disposed at the center of the cylindrical member 55 is pulled back. Next, as shown in FIG 19C, the movable mold 71 and the fixed mold 72 are disengaged from each other. To pull back the pull-out pin 73, it is possible to utilize an oil cylinder, a pneumatic cylinder, or an electric motor as the driving source. Next, as shown in FIG. 20A, by way of simultaneously moving a plurality of projection pins 74 inserted in the movable mold 71 in the forward direction, the cubic body 11 is released from the molding surface of the movable mold 71. As shown in FIG. 20A and 20B, while proceeding with the above mold-releasing process, the cylindrical member 55 itself elastically deforms in the inward direction before eventually being extracted from the movable mold 71.

A variety of practical forms for implementing the present invention have thus been described as exemplified above. It should be understood however that the scope of the present invention is by no means limited to the above embodiments, but a variety of changes, modifications, combinations, and improvements may also be realized based on the fundamentals and technical scope of the present invention.

Figure 21:
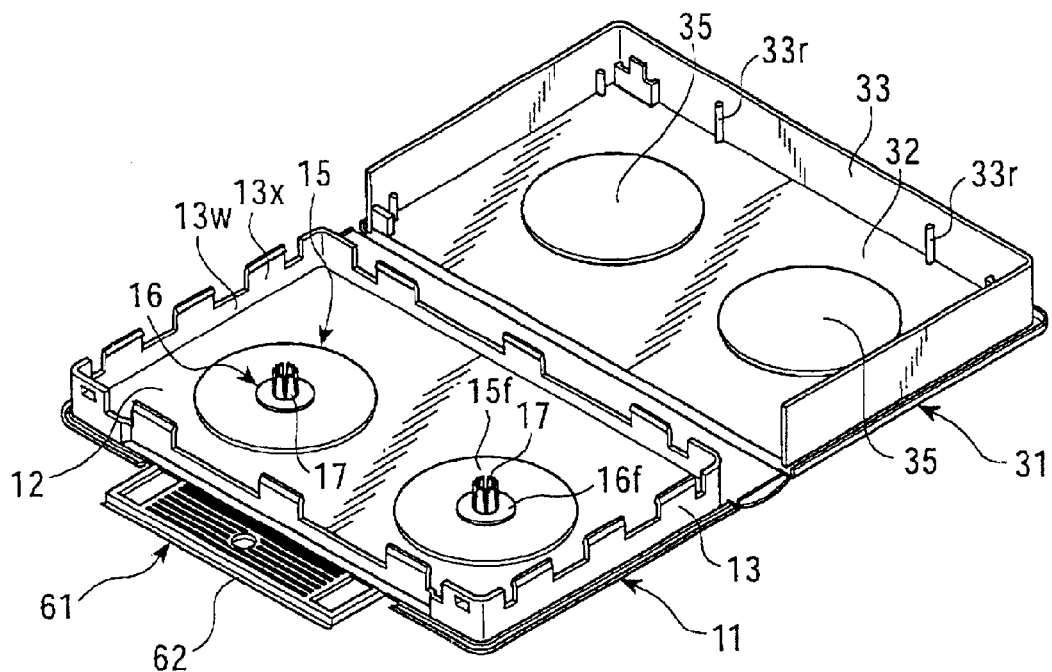
FIG. 21 designates an overall perspective view of a modified example in correspondence with the one shown in FIG. 1, wherein a pair of disk-form projected surface portions are formed in place of the bosses shown in FIG. 1.
Figure 22:
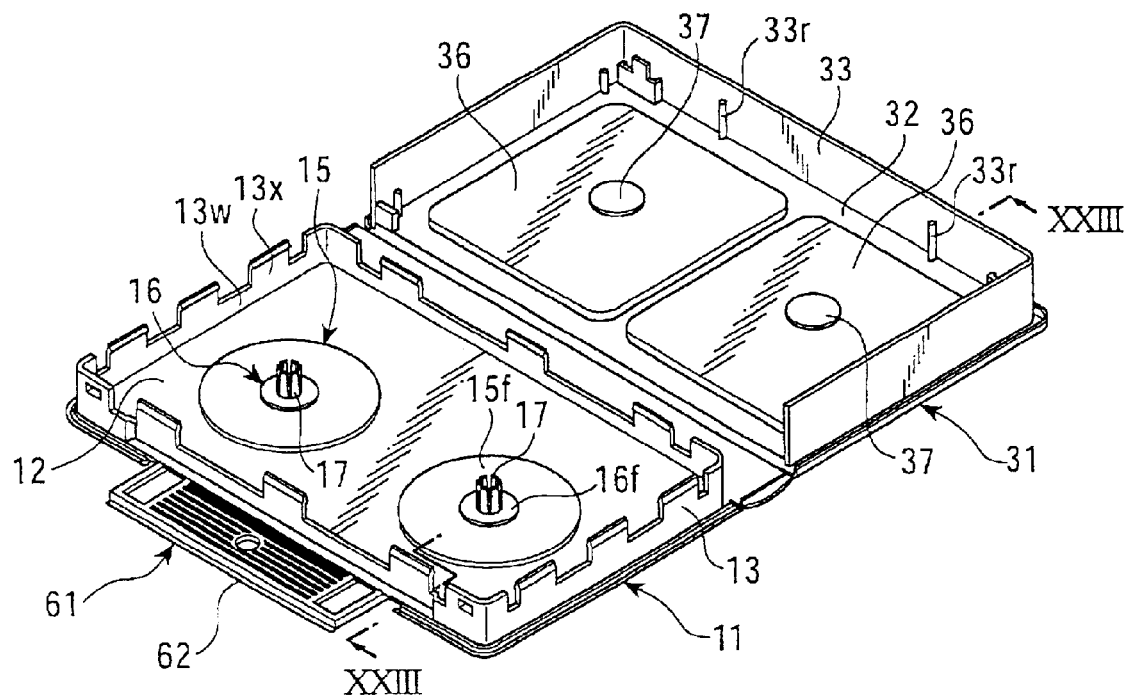
FIG. 22 designates another overall perspective view of another modified example, wherein a pair of corner-rounded, square projected surface portions are formed on the bottom, and yet, a pair of small-disk form projected surface portions are formed above the square projected surface portions.
Figure 23:
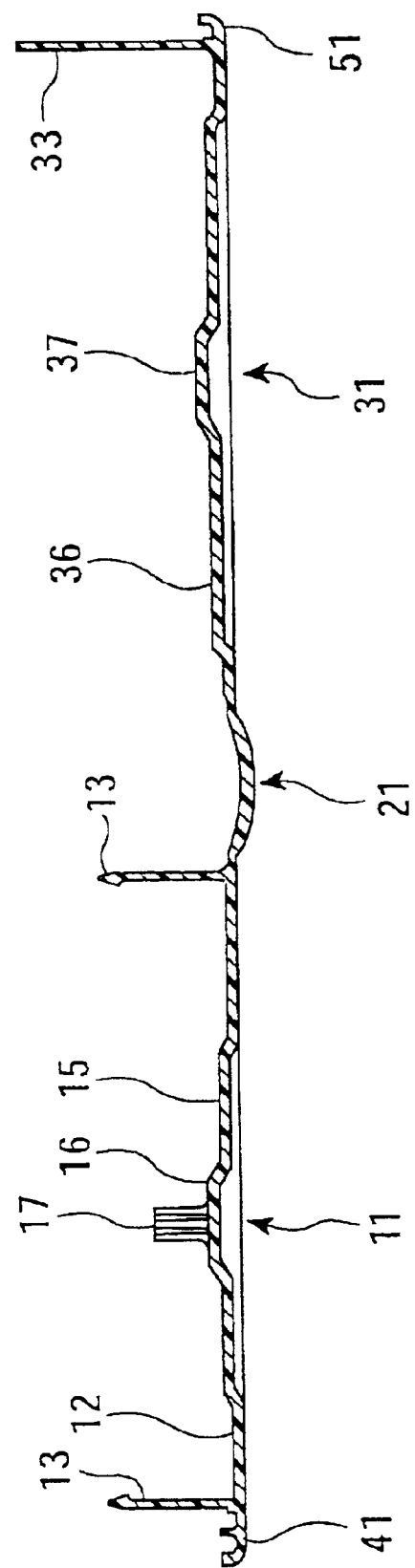
FIG. 23 designates a cross-sectional view along line XXIII—XXIII shown in FIG. 22.
Figure 24:
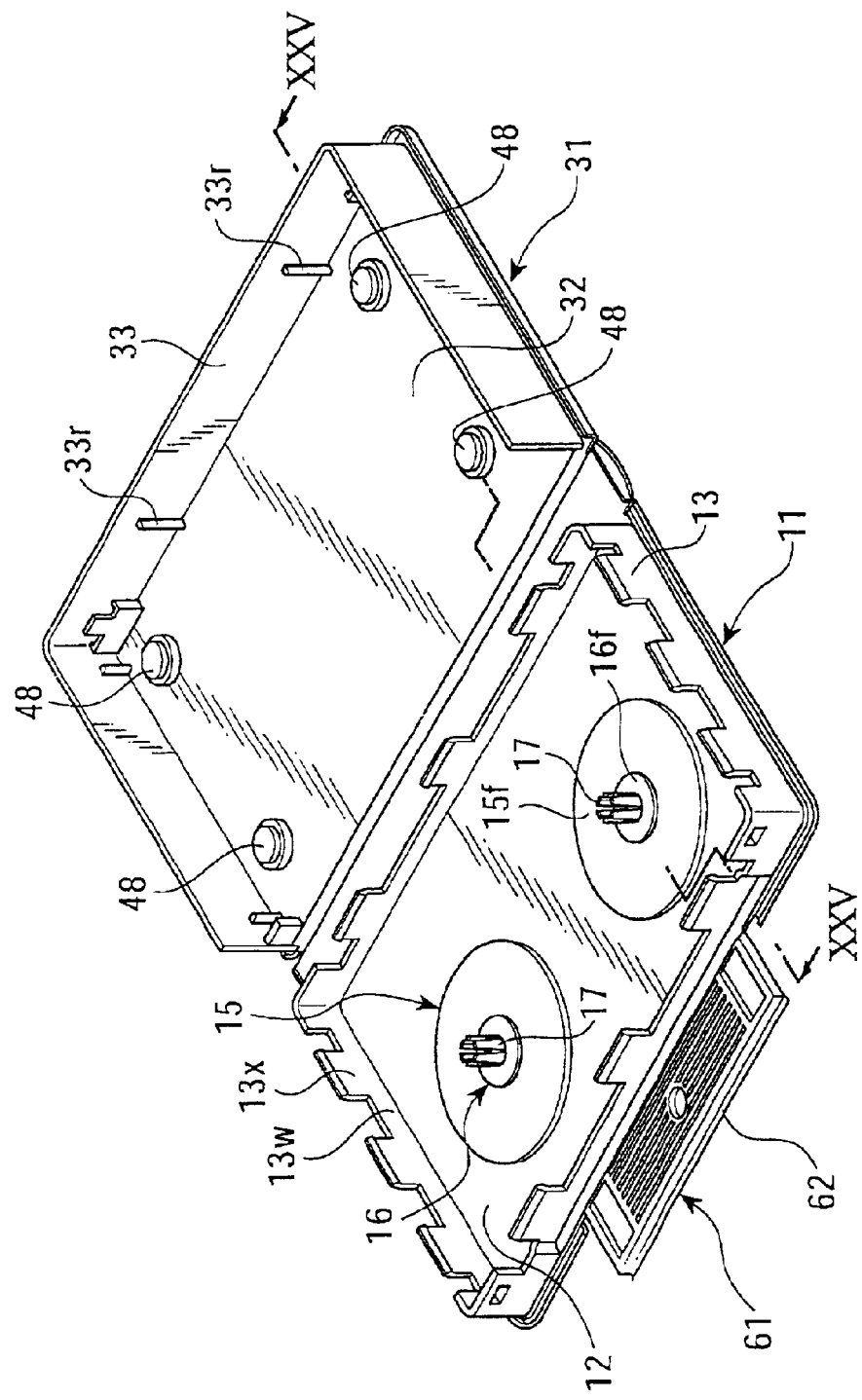
FIG. 24 designates another overall perspective view of a still further modified example, wherein double stage projections ate formed at four corners in place of the bosses shown in FIG. 1.

For example, the above first embodiment of the present invention has exemplified a novel tape cassette storing case 10 capable of properly holding a tape cassette C by virtue of the provision of double stage projected surface portions consisting of an extremely low-height, circular cone, trapezoidal form, lower-side projected surface portion 14 and an upper-side projected surface portion 16, which are respectively formed on the bottom plate 12 of the cubic body 11 of the storing case 10, and a plurality of boss members 34 formed on the ceiling plate 32, which constitutes an inwardly projected surface portion of the lid body member 31. Further, as shown in FIG. 21, by way of replacing the boss members 34, it is also allowable to provide a pair of circular-form projected surface portions 35 corresponding to the lower-side projected surface portions 15 formed on the bottom plate 12. Further, as shown in FIG. 22, by way of replacing a pair of circular form projected surface portions 35 shown in FIG. 21, it is also allowable to provide a corner-rounded, square-form, lower-side projected surface portion 36 and then form a disk-form, upper-side projected surface portion 37 thereon. FIG. 23 designates a cross-sectional view along the line XXIII—XXIII shown in FIG. 22. FIG. 23 exemplifies the inner space of the double stage projected surface portions. Further, as shown in FIG. 24, it also may be configured to provide double-stage projections 48 at four corner portions on the internal surface of the ceiling plate 32. FIG. 25A designates a cross-sectional view along the line XXV—XXV shown in FIG. 24. FIG. 25A exemplifies the aspect of the double-stage projections 48 cited above. FIG. 25A exemplifies hollow inner space of the double-stage projections 48. However, as shown in FIG. 25B, it also may be configured to provide the double-stage projections 48 with solid contents.

Figure 4:
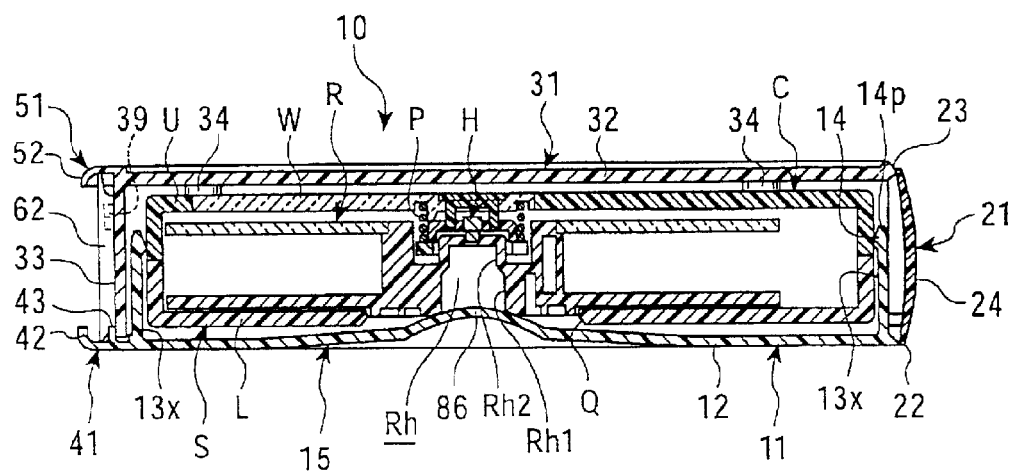
FIG. 4 designates another cross-sectional view of a modified example in correspondence with the one shown in FIG. 3.

The above first embodiment of the present invention provides an arrangement in which the tape cassette C is held by the double-stage projected surface portions consisting of the lower-side projected surface portion 15 and the upper-side projected surface portion 16 formed on the bottom plate 12 of the cubic body 11. However, as shown in FIG. 4, corresponding to FIG. 3, in place of the above arrangement, it also may be configured to initially form a circular-cone, trapezoidal form, lower-side projected surface portion 85 having a substantial area on the bottom side on the bottom plate 12, followed by a process to form a spherical upper-side projected surface portion 86 having an upper surface that is spherically extended furthermore, and followed by an ensuing process to insert the spherical upper-side projected surface portion 86 into the reel-base inserting opening Q of the lower shell L of the tape cassette C to cause the upper portion of the spherical projected surface portion 86 to be brought into contact with the reel R. Further, it also may be configured to cause the reel R to hold the tape cassette C in the state in which the reel L is afloat above the lower shell L. Those components other than the portion for holding the tape cassette C shown in FIG. 4 are exactly identical to those that are shown in FIG. 3, and thus, identical components are designated by identical reference numerals, and a description of these is omitted.

Referring to a variety of practical forms for implementing the first embodiment, the above description has referred to the provision of multiple-stage projected surface portions 15 and 16 on the bottom plate 12 and further provision of the cylindrical member 17 on the uppermost surface 16f. This is not the only arrangement, but as shown in FIG. 26, it also may be configured to erect cylindrical members 91–93 directly on the leveled bottom plate 12.

Figure 26A:
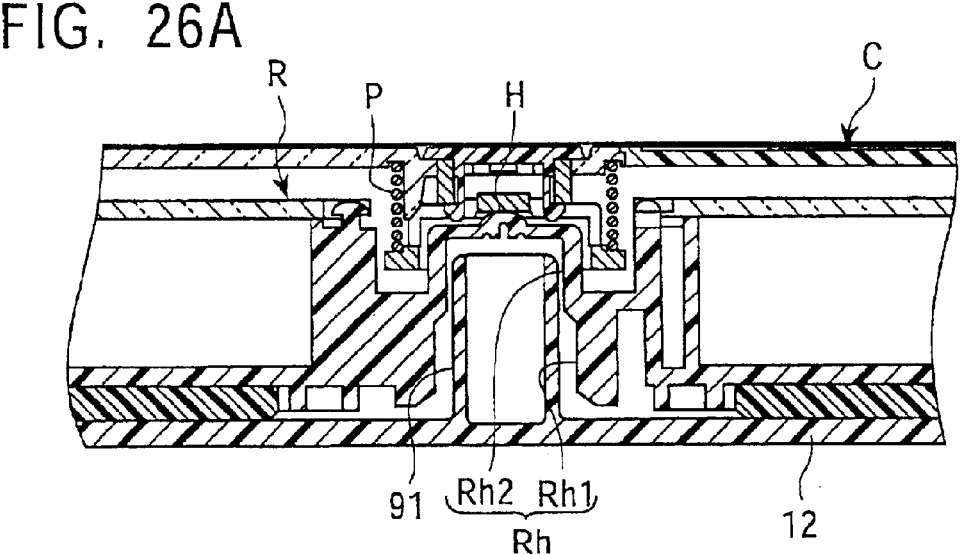
FIG. 26A–FIG. 26C individually designate lateral sectional views of essential components for designating further variations of the construction of the cylindrical members according to the present invention.

FIG. 26A exemplifies such a construction in which the closed portion of the cylindrical member 91 is disposed on the bottom plate 12, where the tip end of the cylindrical member 91 is arranged to be of a height enough to arrive at the reference hole portion Rh2 of the hub hole Rh. Inasmuch as the cylindrical member 91 has a height enough to arrive at the reference hole portion Rh2 of the hub hole Rh, elastic deformation of the cylindrical member 91 is generated at the tip portion coming into contact with the reference hole portion Rh2. Because of this, the whole of the cylindrical member 91 easily becomes elastically deformable, thus promoting the effect to buffer incurring shock.

Figure 27:
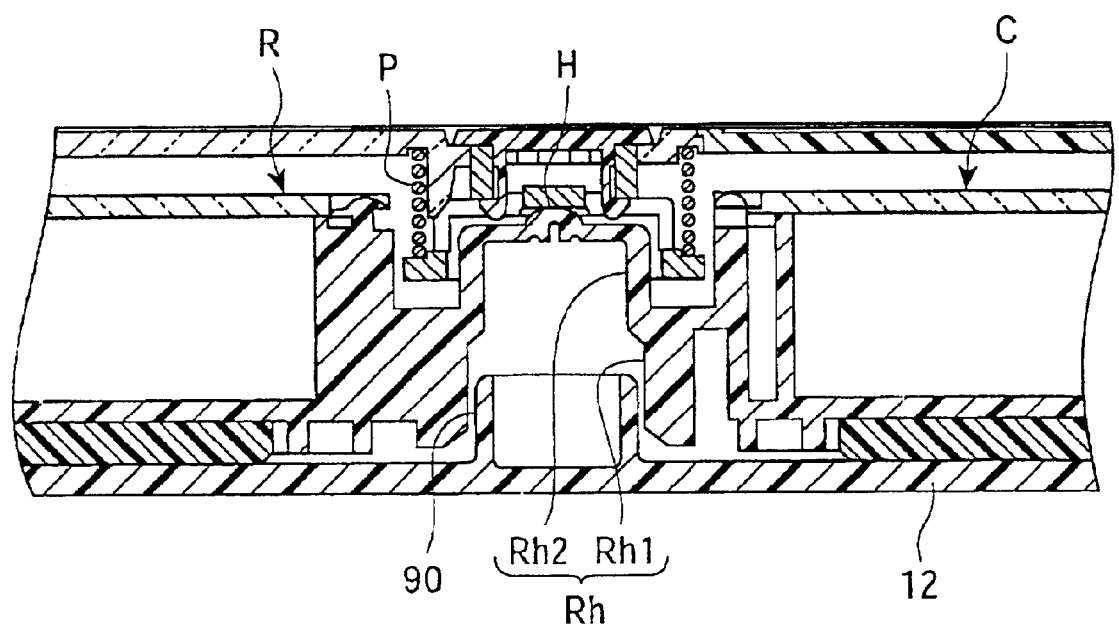
FIG. 27 designates a lateral sectional view of essential components of the tape cassette as further examples in comparison to the variations shown in FIG. 26.

FIG. 27 designates the construction of the essential components of a tape cassette storing case incorporating a cylindrical member 90 having its tip portion inserted inside of the driving pawl hole Rh1 of the hub Rh as a comparative example. In this example, inasmuch as elastic deformation of the cylindrical member 90 is generated via the contact with the driving pawl hole portion Rh1 of the hub hole Rh, the elastically deformable property is lower than the above-referred case, and thus, this comparative example can hardly generate a significant improvement in the effect for absorbing the shock incurring thereto.

Figure 26B:
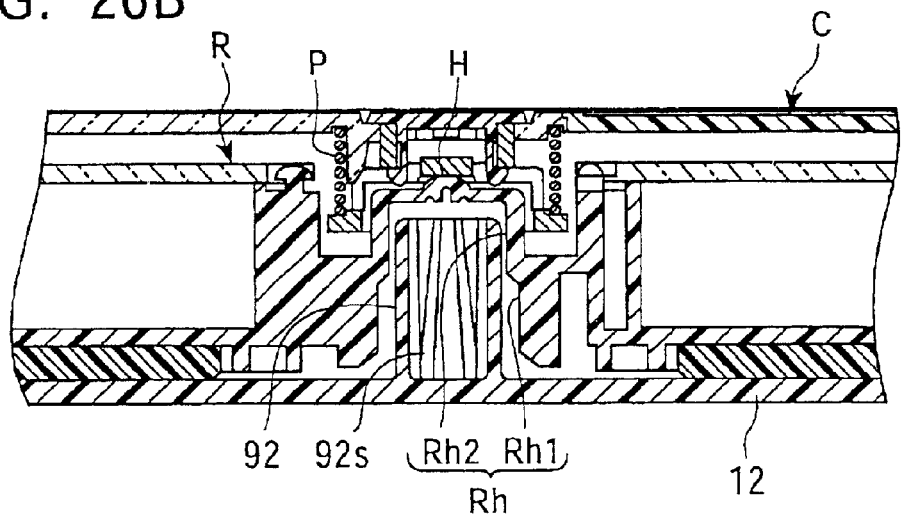
Figure 26C:
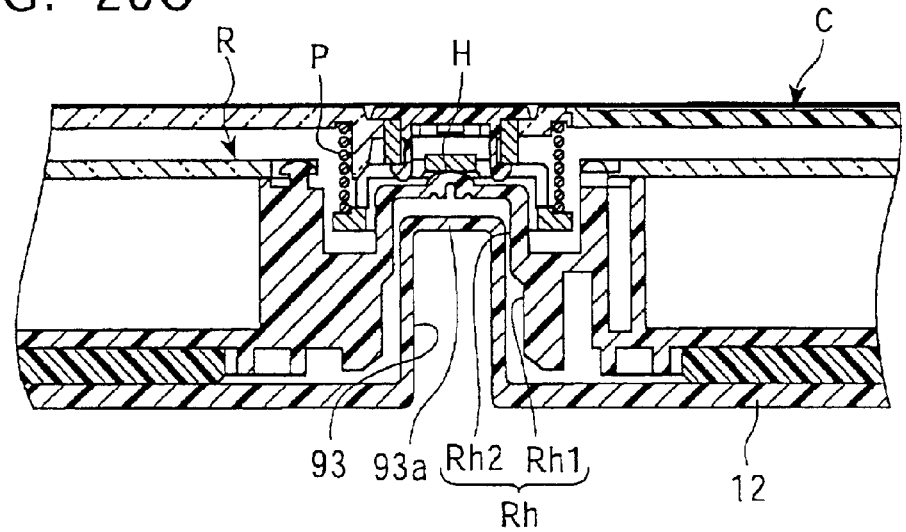

On the other hand, such a cylindrical member 92 shown in FIG. 26B is added with a predetermined number of slits 92b in the height direction in contrast with the above-cited cylinder member 91. Owing to the provision of the cylindrical member 92, the elastically deformable property has been improved. As shown in FIG. 26B, provision of the above slits 92s is not solely limited to the entire height-directional area of the cylindrical member 92, but it is also allowable to form these slits 92s at least on the part of the tip end portion thereof FIG. 26C designates an example in which a cylindrical member 93 is at a position having its blockade end portion 93a arriving at the reference hole portion Rh2.

The above description has referred to the tape cassette storing case 10 as the one having its planar form comprising a substantially rectangular prism form. Instead of this, it also maybe configured to provide a planar form corresponding to an octahedral form formed by deleting rectangular corners or an elliptical form having semicircle longitudinal both ends without definitely restricting the planar form.

The above first embodiment of the present invention has provided the cubic body 11 with a square-form, elastically deformable projected wall member 13x. However, it also may be configured to utilize any form other than the square-form projected wall member 13x. For example, a square form with a handle portion or an inverse trapezoidal form capable of generating a substantial amount of elastic deformation also may be utilized. Further, the above embodiment also has formed the upper edge portion of the projected wall member 13x by way of facing the inner side of the cubic body via provision of projections 14 and 14' at the upper edge portion thereof. However, instead of this method, it also may be configured to provide the above gradient by way of linearly forming the projected wall member 13x from the upper edge of a low-wall member 13w to the inner side thereof On the other hand, as shown in FIG 1, the above embodiments of the present invention have provided four of the boss members 34 at four corners on the internal surface of the ceiling plate 32. However, there is no restriction on a number and positions of boss members to be installed. Further, by way of filling the inner space of the boss members 34 with elastic material such as rubber for example, the shock absorbing function can be promoted further.

Figure 28A:
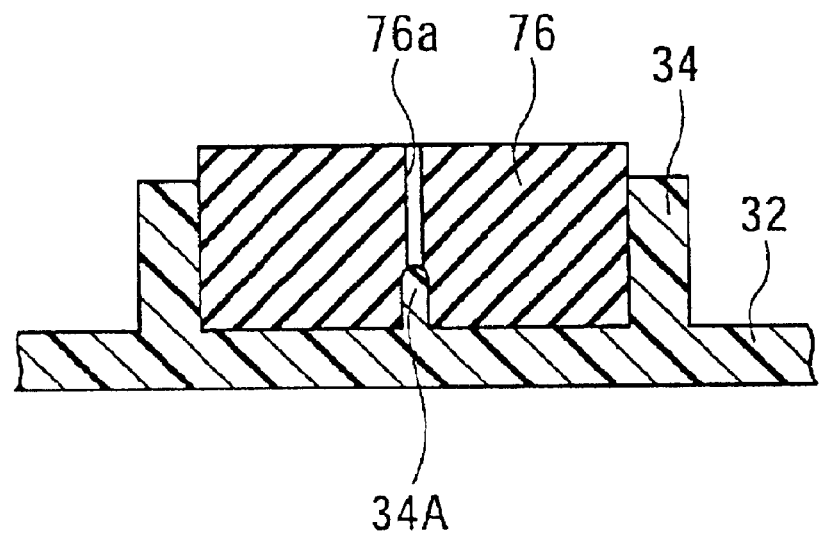
FIG. 28A and FIG. 28B designate lateral sectional views of essential components for exemplifying the construction of the projections related to the present invention.
Figure 28B:
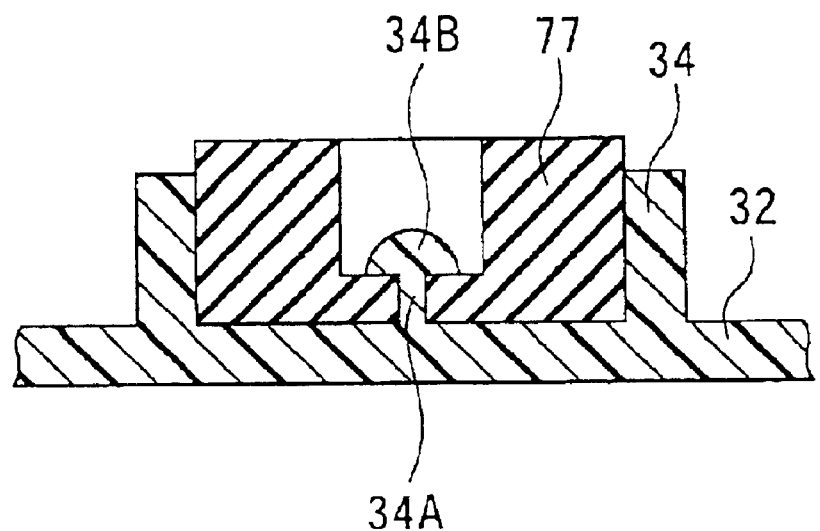

FIG. 28 exemplifies a construction of the boss members 34 filled with elastic material. FIG. 28A exemplifies a case in which elastic material 76 is filled into a boss member 34 by way of utilizing a pin 34A erected at the center of the boss member 34 comprising an annular rib member. In this case, as a matter of course, it is desirable that an inserting hole 76 formed inside of the elastic material 76 is of a diameter narrower than that of the pin 34A. On the other hand, FIG. 28B exemplifies a case in which, after completing the insertion of elastic material 77 into the pin 34A, the head portion of the pin 34A is caulked via fusion to prevent the elastic material 77 from externally being lost. In this case, it is suggested that the inserting hole 77a to be filled with the elastic material 77 be of stepped construction and the hole with a fine diameter be arranged to be identical to that of the pin 34A. In addition, it is also allowable to introduce such a conventional method for integrating the elastic material 77 with the boss member 34 by way of coating them with adhesive agent, for example.

When implementing each of the above embodiments of the present invention, double locking is realized by applying the side-locking member 61 and the lateral-wall locking member 38. However, the locking also may be effected solely by means of the lateral-wall locking member 38. On the other hand, it also may be configured to provide more than two of the flap plates 62 or 62' for composing the side-locking member 61 by way of contracting form. In addition, it also may be configured to provide more than two of the stopper members 39' for engaging the flap plate 62' therewith by way of abutting on each other.

The above description has referred solely to a tape cassette storing case for storing professional purpose tape cassettes therein. However, the tape cassette storing case according to the present invention is also applicable to a tape cassette storing case for storing conventional tape cassettes used for general consumers as well.

What is claimed is:

1. A tape cassette storing case for storing a tape cassette comprising:

a cubic body fitted with lateral walls;

a lid body fitted with lateral walls and put on said cubic body; and a junction member for constituting one of the lateral walls of said lid body in linkage with said cubic body and said lid body via hinging means; wherein said tape cassette comprises a shell internally accommodating a tape-supplying reel and a tape take-up reel;

said tape cassette storing case further comprises a pair of cylindrical members that are vertically disposed on a bottom plate of said cubic body by way of being idly inserted in hub holes of said tape-supplying reel and said tape take-up reel respectively;

each of said hub holes comprises; a driving pawl hole having an inner peripheral surface formed with a reel-driving pawl and a reference hole formed in concentricity with said driving pawl hole and provided with diameter smaller than that of said driving pawl hole;

said pair of cylindrical members are respectively formed to be of such a height so as to arrive at said reference hole;

a plurality of slits are formed at least at tip portions of said pair of cylindrical members along a height direction;

said junction member comprises an externally projected substantially arc-form curved surface portion disposed between a pair of hinging means, said curval surface portion being elastically deformable;

a pair of identical substantially arc-form ribs are formed on an internal surface of each longitudinal-directional end;

a bottom plate of said cubic body and a ceiling plate of said lid body are respectively thinly extended outwardly from the lateral walls of said cubic body and also from the lateral walls of said lid body; and tip end portions of said externally extended bottom and ceiling plates respectively constitute elastically deformable external peripheral edges by way of being inwardly bent into a substantially elliptic circular arc curved surface or substantially circular-arc form curved surface.

2. A tape cassette storing case for storing a tape cassette comprising:

a cubic body fitted with lateral walls;

a lid body fitted with lateral walls and put on said cubic body; and a junction member for constituting one of the lateral walls of said lid body in linkage with said cubic body and said lid body via hinging means; wherein said tape cassette comprises a shell internally accommodating a tape-supplying reel and a tape take-up reel;

said tape cassette storing case further comprises a single unit or a plurality of elastically deformable projected surface portions that are integrally molded with resinous material;

said single or plural projected surface portions contain space within inwardly projected projections at least on a part of a bottom plate of said cubic body or on a part of a ceiling plate of said lid body;

said single or plural projected surface portions jointly support said tape cassette by way of coming into contact with said shell of said tape cassette or at least one of said reels;

a pair of cylindrical members idly inserted in corresponding hub holes of said reels are vertically disposed on an upper surface of said projected surface portions; and a plurality of slits are formed at least at a tip portion of said cylindrical members in a height direction.

3. The tape cassette storing case according to claim 3, further comprising:

a single unit or a plurality of projection portions that respectively project themselves in an inward direction from the upper surface of said projected surface portions and come into contact with the shell of said tape cassette.

4. The tape cassette storing case according to claim 3, wherein said projection portions individually comprise an annular-form rib member that is internally filled with elastic material.

5. The tape cassette storing case according to claim 3, wherein:

said ceiling plate comprises a single-stage of said projected surface potions;

said projection portions are formed at four corner sections on the inner surface of said single-stage projected surface portion; and said tape cassette storing case further comprises a card-inserting pocket formed on the inner surface of said ceiling plate by way of peripherally fusing a transparent sheet or film on the inner surface of said ceiling plate without fusing substantially the center portion of said transparent sheet or film, by way of utilizing said projections for the positioning thereof.

6. The tape cassette storing case according to claim 2, wherein:

said ceiling plate comprises a single stage of said projected surface portions; and a projected base member is disposed on an external surface of said bottom plate at an inward position from externally stepped peripheral edges of said projected surface portion.

7. The tape cassette storing case according to claim 2, wherein said projected surface portion comprises two or more than two multiple-stage projected surface portions.

8. The tape cassette storing case according to claim 7, wherein said multiple-stage projected surface portions are formed in concentricity with an opening for allowing the insertion of a reel base of said tape cassette to be stored;

the uppermost part of said multiple-stage projected surface portions is inserted in said reel-base insertion opening; and the upper surface of said uppermost projected surface portion comes into contact with said reel to hold said tape cassette.

9. The tape cassette storing case according to claim 2, wherein the width of said slits formed at the lip end portions of said cylindrical members increases as the distance to the tip portion of said cylindrical members becomes shorter.

10. The tape cassette storing case according to claim 2, wherein a plurality of externally swollen and substantially rounded portions are formed at the tip end of said cylindrical members.

11. The tape cassette storing case according to claim 2, wherein at least one of said lateral walls on a part of said cubic body comprises lateral wall members and projected wall members upwardly projecting themselves from a predetermined position of an upper edge of said lateral wall members; and at least the upper edge portion of said projected wall members is formed by way of inwardly facing to said cubic body.

12. The tape cassette storing case according to claim 11, further comprising:

a plurality of projection portions formed on the internal surface of the upper edge of said projected wall members.

13. A tape cassette storing case for storing a tape cassette comprising:

a cubic body fitted with lateral walls;

a lid body fitted with lateral walls and put on said cubic body; and a junction member for constituting one of said lateral walls of said lid body in linkage with said cubic body and said lid body via hinging means; wherein said tape cassette comprises a shell internally accommodating a tape-supplying reel and a tape take-up reel;

said junction member comprises an externally projected substantially arc-form curved surface portion disposed between a pair of hinging means, said portion being elastically deformable; and a pair of identical substantially arc-form ribs are formed on an internal surface of each longitudinal-directional send.

14. A tape cassette storing case for storing a tape cassette comprising:

a cubic body fitted with lateral walls;

a lid body fitted with lateral walls and put on said cubic body; and a junction member for constituting one of the lateral walls of said lid body in linkage with said cubic body and said lid body via hinging means; wherein said tape cassette comprises a shell internally accommodating a tape-supplying reel and a tape take-up reel;

a bottom plate of said cubic body and a ceiling plate of said lid body are respectively thinly extended outwardly from the lateral walls of said cubic body and also from the lateral walls of said lid body; and tip end portions of said externally extended bottom and ceiling plates respectively constitute elastically deformable external peripheral edges by way of being inwardly bent into a substantially elliptic circular arc curved surface or substantially circular-arc form curved surface.

15. The tape cassette storing case according to claim 14, further comprising:

an inhibiting wall vertically erected at an inward position from the curved surface of said tip end portion of the external peripheral edge portion on a part of said bottom surface by way of being close to the external surface of the lateral walls of said lid body.

16. The tape cassette storing case according to claim 14, further comprising:

a single unit or a plurality of side locking members on a side opposite from said junction member by way of omitting said external peripheral edges; wherein a flap plate connected to said bottom plate via hinging means is laid on and engaged with a lateral wall member of said lid body at an inward position from a tip edge of said external peripheral edge member; and double locking is effected by combining said side locking member with a lateral-wall locking member for locking the lateral walls of said cubic body and the laterals walls of said lid body.

17. The tape cassette storing case according to claim 16, wherein said flap plate forms a substantially trapezoidal form having an edge side on a part of said hinging means that is longer than another edge side of an external edge opposite from the longer edge side; and a plurality of stopper members are formed along lateral walls of said lid body for engaging said flap plate therewith.

18. The tape cassette storing case according to claim 17, wherein a plurality of recessed portions are formed by way of partially omitting corner portions between said lateral walls fitted with said stopper members and said ceiling plate of said lid body.

19. A tape cassette storing case for storing a tape cassette comprising:

a cubic body fitted with lateral walls;

a lid body fitted with lateral walls and put on said cubic body; and a junction member for constituting one of the lateral surfaces of said lid body in linkage with said cubic body and said lid body via hinging means; wherein said tape cassette comprises a shell internally accommodating a tape-supplying reel and a tape take-up reel; and said tape cassette storing case further comprises:

a single unit or a plurality of elastically deformable projected surface portions that individually contain space in each inwardly oriented projection at least formed on a bottom plate of said cubic body or on a ceiling plate of said lid body, said elastically deformable projected surface portions jointly supporting said tape cassette by way of coming into contact with said shell of said tape cassette or at least either of said reels;

a pair of cylindrical members vertically erected on an upper surface of said projected surface portions to be idly inserted in corresponding hub holes of said reels;

a plurality of projected wall members that individually project themselves at least from predetermined positions of an upper edge of one of said lateral walls of said cubic body, each of said projected wall members being formed with a projected portion on an inner surface at the upper edge thereof;

elastically deformable external peripheral edge members that are externally thinly extended from said bottom plate and said ceiling plate outwardly from the lateral walls of said cubic body and the lateral walls of said lid body, a tip portion of said extended peripheral edges being inwardly bent into a substantially elliptic circular-arc form curved surface or a substantially circular-arc form curved surface; and junction members comprising an externally projecting elastically deformable substantially circular-arc form curved surface extending between a pair of hinges and a plurality of identical substantially circular-arc form rib members that are formed on an internal surface side along each longitudinal send, said junction members being integrally formed with resinous material.

* * * * *